(12) United States Patent
van Valkenburg

(10) Patent No.: US 9,440,371 B2
(45) Date of Patent: Sep. 13, 2016

(54) SYSTEM AND DEVICE FOR HOLDING A WORK PIECE TO BE MACHINED BY A ROUTER AND USE THEREOF

(76) Inventor: Sjoerd Anne van Valkenburg, The Hague (NL)

( * ) Notice: Subject to any disclaimer, the term of this patent is extended or adjusted under 35 U.S.C. 154(b) by 1141 days.

(21) Appl. No.: 13/485,164

(22) Filed: May 31, 2012

(65) Prior Publication Data

US 2012/0237310 A1 Sep. 20, 2012

Related U.S. Application Data

(63) Continuation-in-part of application No. 12/497,863, filed on Jul. 6, 2009, now Pat. No. 8,201,601.

(60) Provisional application No. 61/078,508, filed on Jul. 7, 2008.

(51) Int. Cl.
| | |
|---|---|
| *B27C 5/06* | (2006.01) |
| *B23D 47/04* | (2006.01) |
| *B27B 25/10* | (2006.01) |

(52) U.S. Cl.
CPC ............... *B27C 5/06* (2013.01); *B23D 47/04* (2013.01); *B27B 25/10* (2013.01); *Y10T 409/303752* (2015.01)

(58) Field of Classification Search
CPC ............ B27C 5/02; B27C 5/04; B27C 5/06; B25B 1/02; B25B 1/06; B25B 1/08; B25B 1/10; B25B 5/02; B25B 5/06; B25B 5/10; B25B 5/163; B25B 5/166; B25H 1/08; B25H 1/10; B23Q 3/06; B23Q 3/066; B23Q 3/067; B23Q 3/069; Y10T 409/306608; Y10T 409/30784; Y10T 409/307952; Y10T 83/741

USPC ............. 144/250.12, 250.15, 250.19, 250.2, 144/278.1, 307, 253.4, 253.6, 253.7
See application file for complete search history.

(56) References Cited

U.S. PATENT DOCUMENTS

| | | | |
|---|---|---|---|
| 4,448,406 A * | 5/1984 | Hallberg et al. ............. 269/224 |
| 5,117,880 A | 6/1992 | Kapton et al. | |
| 5,325,899 A | 7/1994 | Kochling | |
| 5,611,378 A * | 3/1997 | Brazell ....................... 144/135.2 |
| 7,140,286 B2 * | 11/2006 | Schwartz ....................... 83/446 |
| 7,240,704 B1 | 7/2007 | Vice | |
| 7,360,567 B2 | 4/2008 | Gregoire | |
| 7,819,145 B1 | 10/2010 | Vice | |
| 2006/0185485 A1 * | 8/2006 | Wang ........................... 83/436.2 |

* cited by examiner

*Primary Examiner* — Matthew G Katcoff
(74) *Attorney, Agent, or Firm* — Sand & Sebolt

(57) ABSTRACT

A holding device and method for engaging a work piece to route an end thereof. The device includes parallel first and second side plates and first and second clamping plates; where the clamping plates are positioned between the side plates. A connector member connects all the plates together. An activator assembly is engaged with the plates and, in a first instance, moves the clamping plates laterally toward each other and in a second instance moves them laterally away from each other. When moved toward each other, each clamping plate contacts one of the elongated sides of the work piece and the work piece is thereby clamped between the clamping plates. A clamping element extends downwardly from the connector member to contact the work piece. The holding device is usable in two different orientations to enable routing of the end face or second face of the work piece.

22 Claims, 19 Drawing Sheets

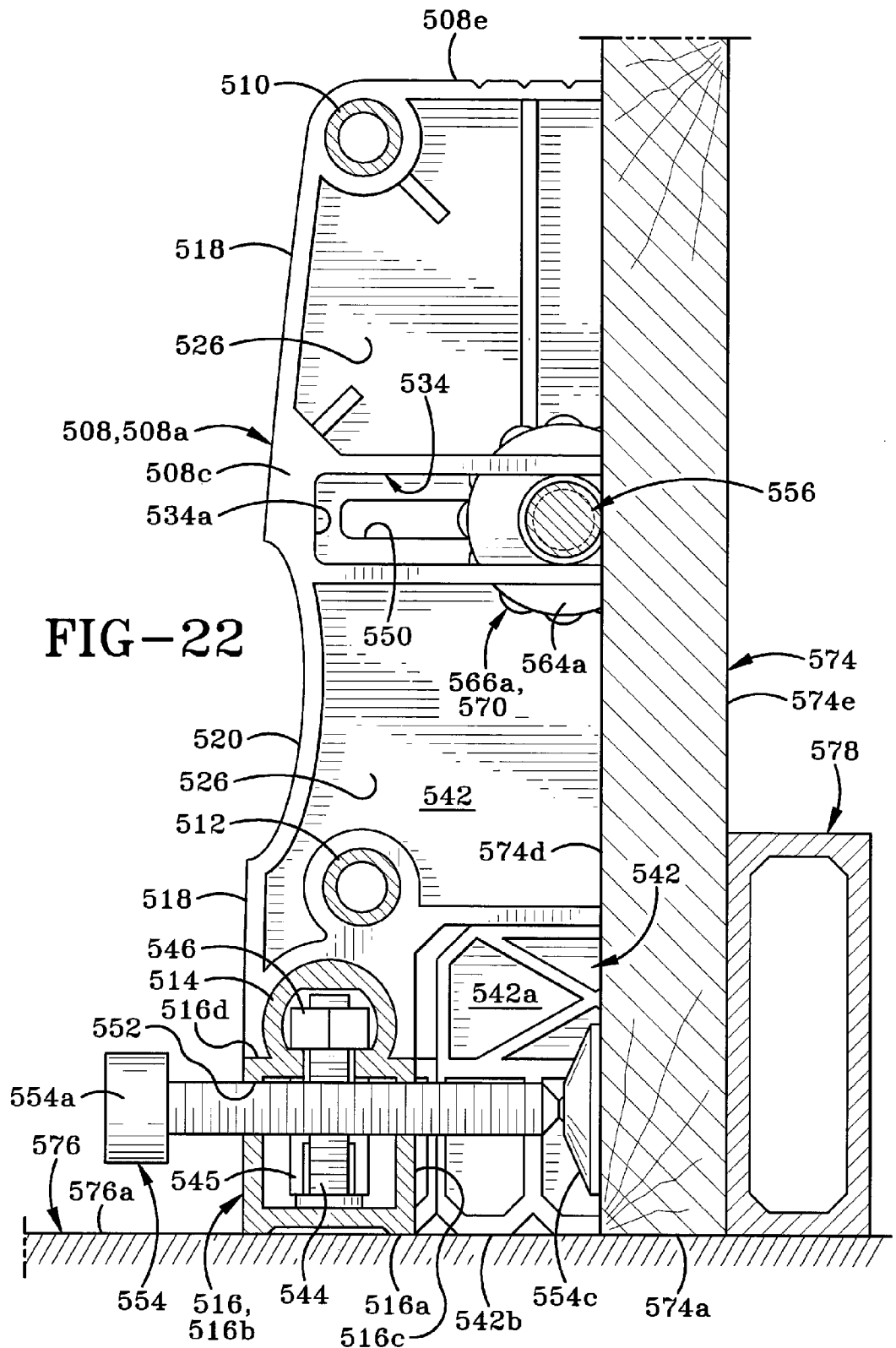

SYSTEM AND DEVICE FOR HOLDING A WORK PIECE TO BE MACHINED BY A ROUTER AND USE THEREOF

CROSS-REFERENCE TO RELATED APPLICATIONS

This application is a Continuation-in-Part of U.S. patent application Ser. No. 12/497,863, filed Jul. 6, 2009, which application claims the benefit of U.S. Provisional Application Ser. No. 61/078,508, filed Jul. 7, 2008, the entire specifications of which are incorporated herein by reference.

BACKGROUND OF THE INVENTION

1. Technical Field

The present invention relates to a system and device for holding a work piece to be machined by a router. The invention also relates to the use of a method and device for holding the work piece to be machined. In particular, the present invention is a device for holding a work piece in a position suitable for routing the end thereof.

2. Background Information

A router is a tool, especially used in the woodworking industry, used for milling out (hollowing out) or routing an area in the face of a piece of material (work piece). Usually the material is wood or metal but applying the router to other types of materials is also possible. There are several types of routers. Nowadays, most common types are spindle type routers (spindle routers), where a router bit is mounted onto a rotatable spindle of an electric motor. A typical router set-up includes a frame for supporting the router table. The piece of material to be machined is supported by the router table. The router table has an opening through which a bit protrudes for machining the material. Different bit sizes and shapes can be used, and the bit is easily exchangeable. The bit is engaged by a collet provided with a clamping mechanism such as a number of clamps or jaws. The collet is part of a rotatable spindle that is connected to a motor drive for rotation. The router collet (and router bit mounted in the mouth of the collet) can be rotated around an axis perpendicular to the router table. Sometimes the collet may be able to move with respect to the router table, for example, along the axis of rotation by a depth adjustment tool. In this case, the shape of the cut that is created is determined by the size and shape of the bit (cutter) held in the collet and the height of the bit relative to the work piece. The bit may machine a work piece from the bottom of the piece by positioning the work piece over the opening in the router table and the bit to e.g. form a shaped groove or a shaped recess in the work piece. The bit may machine the work piece from a side by positioning the work piece adjacent to the opening in the router table with the router bit acting on the side of the work piece, to e.g. form a tapered side, or to form a groove in the side of the work piece.

A typical router system also includes a router fence. The router fence is placed on top of the table and is used as a stop along which the work piece can be guided during the machining thereof to ensure that proper parts of the work piece are cut away. The router fence is used as a directional tool during the processing of the work piece.

End grain wood, being the narrower side (the end) of a board, is difficult to guide along (and square to) the router fence of the router table without a considerable risk of it being pulled into the router bit which may damage the work piece and/or which may cause a hazardous situation. This is in contrast to guiding the long grain side of a board that can slide easily along the router fence, without a serious risk of it being pulled into the router bit.

In order to provide an improved guidance and to reduce the risk of being pulled into the router bit, the concept of a holding device, also referred to as coping sled or coping jig, used for routing the short end of a work piece (usually the end grain) has been developed in the woodworking industry. To hold the work piece firmly, but in such manner that it can still be moved parallel to the router fence for its edge forming, is a challenge that existing coping sleds have attempted to solve by mounting the clamping devices on a carrier board, exercising downward pressure. This carrier board effectively increases the height of the router table, so that it has to pass underneath the router bit. Consequently the router and/or the router bit have to be mounted higher to compensate for the thickness of the carrier plate.

Furthermore, this arrangement prevents the use of coping sleds vertically, as described above, because they do not have their own fence for keeping the coping sled safely positioned, and the carrier plate cannot ride behind the router bit in this position, as the carrier plate will be in between the router bit and the work piece. This is particularly prejudicial if a particular router bit set-up should not be disturbed between horizontal and vertical operations.

A further drawback of coping sleds using a carrier plate is the risk of deformation of that carrier plate, notably bending up, if more than a minimal clamping force is used to secure the work piece, compromising the integrity of the routing operation.

BRIEF SUMMARY OF THE INVENTION

An object of the present invention is to provide an improved device and system for holding a work piece for machining with a router, especially for a routing operation on an end grain of the work piece, and in particular for machining the end grain of an elongated work piece.

It is another object of the present invention to provide an improved method for holding a work piece for machining with a router, especially for a routing operation on an end grain of the work piece, and in particular for machining the end grain of an elongated work piece.

Embodiments of the present invention provide a device and system wherein at least one of the disadvantages of the prior art has been reduced or even removed.

Embodiments of the present invention provide a system and device wherein the holding and positioning of a work piece with regard to a router bit can be accomplished fast, accurately and/or easily, especially when the work piece is to be routed subsequently in a horizontal position and in a vertical position.

Embodiments of the present invention provide a simple process for machining a piece of material, more specifically a piece of wood, subsequently in a horizontal position and in a vertical position.

The present invention, in part, relates in a first aspect to a system for holding a work piece, the system comprising: a router device arranged and constructed for routing out a part of the work piece with a router bit, a holding device arranged and constructed to hold the work piece while being routed, the router device comprising a first reference element for providing a first guidance reference and a second reference element positioned substantially perpendicular to the first reference element for providing a second guidance reference, both reference elements being arranged so as to guide the holding device in a lateral direction during machining of the work piece, the holding device comprising a clamping arrangement and a guiding arrangement, the guiding arrangement comprising a first guiding element and a second guiding element substantially perpendicular to the first guiding element for guiding the holding device along the first guidance reference and the second reference element, and the clamping arrangement being arranged for clamping the work piece with a clamping force being exercised substantially in the lateral direction.

According to another aspect, the present invention relates to a holding device as such for holding a work piece for being routed using a router device with a router bit, the router device comprising a first reference element for providing a first guidance reference and a second reference element positioned substantially perpendicular to the first reference element for providing a second guidance reference, the reference elements being arranged so as to guide the holding device in a lateral direction during machining of the work piece.

The holding device according to the invention comprises a clamping arrangement and a guiding arrangement;
   the guiding arrangement comprising a first guiding element and a second guiding element substantially perpendicular to the first guiding element for guiding the holding device along the first guidance reference and the second reference element; and
   the clamping arrangement being arranged for clamping the work piece with a clamping force being exercised substantially in the lateral direction.

The first reference element may be a router table for supporting the work piece. The second first reference element may be a router fence. The first guiding element may be a base plate of the holding device. The second guiding element may be a fence plate of the holding device.

The first guiding element may be arranged for guiding the holding device along the first guidance reference, while the second guiding element is arranged for guiding the holding device along the second guidance reference.

Alternatively, the first guiding element may be arranged for guiding the holding device along the second guidance reference, while the second guiding element is arranged for guiding the holding device along the first guidance reference.

With the clamping force being exercised substantially in the lateral direction, there may be substantially no forces perpendicular to the work piece nor to the holding device, thus ensuring absence of unwanted stress or strain in unwanted directions in the work piece which could otherwise deform the work piece, while preventing the work piece from being pulled into the router bit during routing. Deformation of the work piece may cause routing a shape which deviates from the intended shape, which is, at least largely, prevented when using the holding device according to the embodiment of the invention.

In further embodiments, the guiding arrangement is substantially free of the clamping force. Forces exercised on the guiding arrangement could otherwise deform the guiding arrangement. Deformation the guiding arrangement may have the risk of deforming the work piece and/or changing the position of the work piece relative to one, or both, guidance references, which may cause routing a deviating shape or routing at a slightly dislocated position. The holding device according to the further embodiments of the invention advantageously prevent such deformation, may thus ensure a proper guiding.

In an embodiment, the clamping arrangement is further arranged for positioning the work piece substantially in line with at least one of the first guiding element and the second guiding element.

For example, when the first guiding element is arranged for guiding the holding device along the first guidance reference, the work piece may be positioned in line with the first guiding element, e.g. preceding the first guiding element while being guided along the first guidance reference.

In such an arrangement, none of the guiding elements can obstruct the clamping arrangement, thus allowing an unobstructed access to the part of the work piece that needs to be machined.

In an embodiment, the clamping arrangement is detachably connected to the guiding arrangement.

The clamping arrangement and the guiding arrangement thus form separate parts, which are connected during machining. This may allow an easy disassemble and assembly. This may allow assembling a differently sized clamping arrangement when a work piece is too large to be fitted by the clamping arrangement that is connected to the guiding arrangement. Alternatively or additionally, this may allow replacing the guiding arrangement with an alternative guiding arrangement for machining the work piece in another orientation.

Alternatively or additionally, this may allow easy placing of the work piece in the clamping arrangement while the clamping arrangement is disconnected and is more easy to handle than when it is connected to the guiding arrangement.

In another embodiment, the clamping arrangement and the guiding arrangement are an integrally formed part.

Such integrally formed part may be advantageous for cost reasons, and may e.g. be used for a low-end, low-cost market segment.

In an embodiment, the clamping arrangement comprises a first clamping element and a second clamping element arranged for receiving the work piece between the first clamping element and the second clamping element and for clamping the work piece between first clamping element and the second clamping element.

The first clamping element may be a vise plate and the second clamping element may be a vise clamp plate, the vise plate and the vise clamp plate forming a vise with facing vise surfaces for clamping the work piece. The vise plate and the vise clamp plate may comprise non-slip treatments at the vise surfaces holding the work piece.

Such clamping arrangement allows to firmly hold the work piece, while also maintaining free access to surfaces of the work piece to be machined, in particular to the surface at the side of the router table and the end surface at the side of the router fence.

In a further embodiment, the clamping arrangement is arranged to further hold an auxiliary piece between the first clamping element and the second clamping element, the auxiliary piece having substantially the same width as a width of the work piece.

This forms a structure with a high structural integrity while introducing no or only little strain and deformation in the guiding arrangement of the holding device. In a further embodiment the auxiliary piece is positioned close to one edge of the clamping elements of the clamping arrangement, while the work piece is positioned close to a second, opposite edge of the clamping elements. The structure may e.g. form a substantially rectangular box. This may further reduce the risk of stress to occur in the holding device, which may have a positive influence on the accuracy than can be reached in the routing operation.

In a further embodiment, the clamping force is substantially evenly distributed over the work piece and the auxiliary piece during holding the work piece and the auxiliary piece.

This may result in a further improved integrity of the structure and may further limit strain and deformation in the work piece.

For example, for achieving such evenly distribution of the clamping force, in an embodiment, the clamping force is applied to positions on the first clamping element and the second clamping element in between the work piece and the auxiliary piece.

In an embodiment wherein the clamping arrangement is arranged for cooperating with an external clamp providing at least part of the clamping force between the first clamping element and the second clamping element.

The external clamp may e.g. be a hand clamp. Such an external clamp may be easily attached to and detached from the clamping arrangement for introducing and removing the work piece.

In another embodiment, the clamping arrangement further comprises an orientation device between the first clamping element and the second clamping element, the reference device being arranged for maintaining a relative orientation between the first clamping element and the second clamping element.

The orientation device allows the second clamping element plate to move freely while staying parallel to the first clamping element, e.g. while loading the work piece.

The orientation device may e.g. comprise a pair of rigid rods, connected at one side to the vise clamp plate, e.g. threaded into the inside face of the second clamping element, and sliding into holes in the first clamping element.

In a further embodiment, the orientation device is further arranged for providing at least part of the clamping force between the first clamping element and the second clamping element.

The guiding device, such as the pair of rigid rods, may e.g. be threaded along substantially their whole length and a bolt may be screwed on the thread and tightened to firmly clamp the work piece, and optionally the auxiliary piece, between the clamping elements. When the orientation device provides the clamping force itself, no external clamp is needed.

In an embodiment, the holding device is arranged for, in a first condition, holding the work piece for machining the work piece in a first orientation wherein the first guidance element is guided along the first reference element and the second guidance element is guided along the second reference element, and, in a second condition, holding the work piece for machining the work piece in a second orientation wherein the first guidance element is guided along the second reference element and the second guidance element is guided along the first reference element.

The first condition and the second condition may be the same, thus allowing the work piece to be machined in the first and the second orientation while maintaining the work piece in the holding device when changing from machining with the first condition to machining with the second condition. The first and second conditions may particularly be the same when the router can be operated while moving the holding device in either of the two possible directions along the first reference element, e.g. the router fence. The first and second conditions may be the same when the holding device has substantially a mirror symmetry.

The first and second condition may be different, e.g. when the holding device is not symmetrically itself, using a disassembly of the holding device in the first condition and a reassembly in the second condition associated with a mirror image of the holding device in the first condition may change the holding device into its mirror image.

It is an advantage using such holding device that the same holding device may be used for machining the work piece from two orientations, e.g. for creating a mitered corner using a Lock Miter router bit.

In an embodiment, the guiding arrangement of the holding device in the first condition is substantially a mirror image of the guiding arrangement of the holding device in the second condition.

In an embodiment, the guiding arrangement is arranged for being disassembled from the first condition into parts and reassembled into the second condition from the parts.

In an embodiment, the clamping device is substantially a mirror image of itself.

In an embodiment, the guiding arrangement comprises a clearance for allowing an unobstructed machining of the work piece with the router bit.

In particular when the router is used for machining the work piece in a horizontal and a vertical orientation, the guiding arrangement thus allows to machine the work piece up to its edges without e.g. the router bit running into e.g. the holding device.

In an embodiment, the second guidance element comprises a fixation element for adjustably fixating the work piece in position in the holding device.

The fixation element may e.g. be a hold-down piece adjustably mounted onto the holding device. The hold-down piece may e.g. be mounted on a hold-down plate, serving as an intermediate connector for the fixation element.

The fixation element may be held in place by a clamping knob and a T-slot nut for being laterally and vertically adjustable, to ensure stability of the holding device against the reference elements, such as the router table fence, and avoiding tip-in by restricting the movement of the work piece or by securing the work piece in position.

In an embodiment, one of the first reference element and the second reference element is a router table for supporting the work piece, and the router further comprises a router collet positioned beneath the router table, the router collet constructed and arranged to engage the router bit extending through an opening in the router table for machining the work piece.

In a further embodiment, the other of the first reference element and the second reference element is a router fence and the router collet is further constructed and arranged for machining the work piece with the router bit through an opening in the router fence.

According to another aspect, the present invention relates to a method for routing a work piece using a router device comprising a first reference element for providing a first guidance reference and a second reference element positioned substantially perpendicular to the first reference element for providing a second guidance reference, the reference elements being arranged so as to guide the holding device in a lateral direction during machining of the work piece, the holding device comprising a clamping arrangement and a guiding arrangement, the guiding arrangement comprising a first guiding element and a second guiding element substantially perpendicular to the first guiding element for guiding the holding device along the first guidance reference and the second reference element; and the clamping arrangement being arranged for clamping the work piece with a clamping force being exercised substantially in the lateral direction.

In an embodiment, the method comprises: clamping the work piece with the force being exercised substantially in the lateral direction in the clamping arrangement in the holding device, guiding the holding device holding the work piece along the first guidance reference and the second guiding reference, and machining the work piece while the holding device is guided.

In an embodiment, the method further comprises: holding a auxiliary piece having a substantially same width as a width of the work piece in parallel to the work piece while clamping the work piece in the clamping arrangement.

In an embodiment, the method comprises, first, holding the work piece for machining the work piece in a first orientation, guiding the first guidance element along the first reference element and the second guidance element along the second reference element, while the holding device is in a first condition, and subsequently, holding the work piece for machining the work piece in a second orientation wherein the first guidance element is guided along the second reference element and the second guidance element is guided along the first reference element, while the holding device is in a second condition.

In an embodiment, the method comprises, after machining the work piece in the first orientation with the holding device in the first condition and before machining the work piece in the second orientation: disassembling the holding device into parts, and reassembling the parts for forming the holding device in the second condition, wherein the guiding arrangement is substantially a mirror image of the guiding arrangement of the holding device in the first condition.

In an embodiment, the method comprises: first, holding the work piece with the holding device for machining the work piece in a first orientation, guiding the first guidance element along the first reference element and the second guidance element along the second reference element, and subsequently, holding the work piece with a second holding device for machining the work piece in a second orientation wherein the first guidance element of the second holding device is guided along the second reference element and the second guidance element of the second holding device is guided along the first reference element, the second holding device being substantially a mirror image of the first holding device.

The present invention is particularly suited for setting up an improved device for machining an end part of the piece, but is not limited thereto. The system and device may be able to position the work piece with respect to the router bit at different positions, e.g. when the piece is relatively small and therefore difficult to handle on a router, the system and device may be helpful also for machining the bottom surface of the work piece from below.

The system according to the present invention may include a router, a router table, a router fence and the holding device as described herein. The holding device may be integrated with the system, but can also be a separate part. This allows the holding device to be stored easily.

The holding device can be mounted on the router table. It can be secured in place using a gauge track running across the router table. The holding device can have a gauge connector for engaging the track. The track may run parallel to the fence and to the process direction of the bit.

In yet another embodiment a holding device and method for engaging a work piece to machine an end thereof is disclosed. The device includes parallel first and second side plates and first and second clamping plates; with the clamping plates positioned between the side plates. A rail connects one end of all the plates together. An activator assembly is engaged with the plates. In a first instance, the activator assembly moves the clamping plates laterally toward each other. In a second instance the assembly moves the plates laterally away from each other. When moved toward each other, each clamping plate contacts one of the elongated sides of the work piece and the work piece is thereby clamped between the clamping plates. A clamping element extends downwardly from the rail to contact the work piece. The holding device is usable in two different orientations to enable routing of the end face or lower face of the work piece.

BRIEF DESCRIPTION OF THE SEVERAL
VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Embodiments of the invention will now be described by way of example only, with reference to the accompanying drawings, wherein:

FIG. 22 is cross-sectional left side view of the holding device oriented in a second position to bring an end of the work piece into a position to be engaged by a router.

Similar numbers refer to similar parts throughout the drawings.

DETAILED DESCRIPTION OF THE INVENTION

Figure 1A:
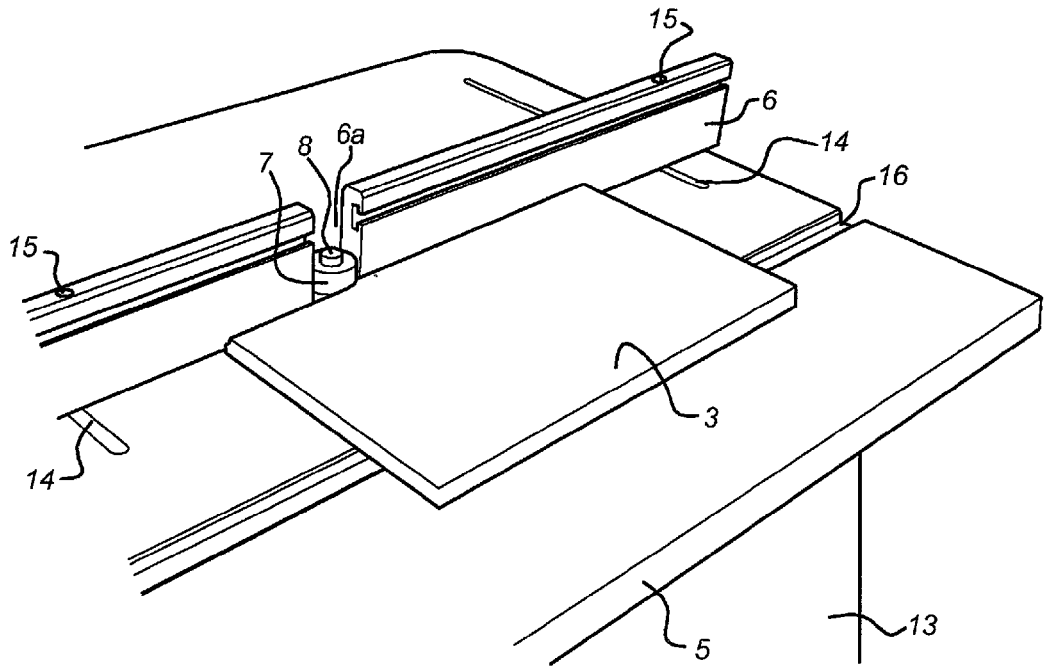
FIG. 1a and FIG. 1b show perspective views of a system with a work piece on a router table according to the prior art.
Figure 1B:
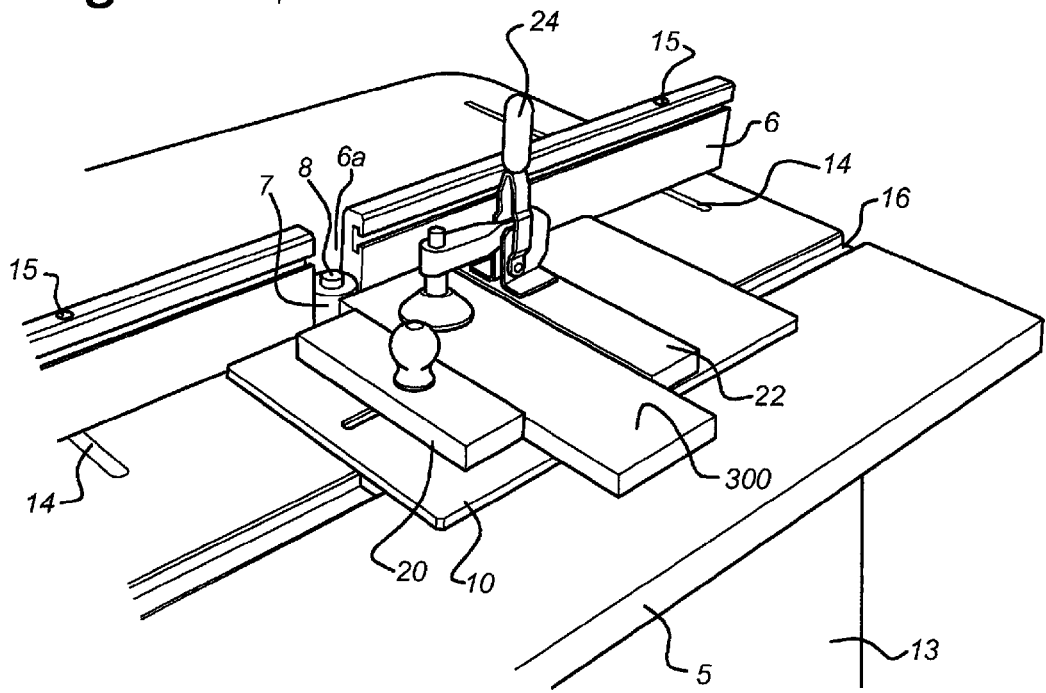

FIG. 1a and FIG. 1b shows a router 1 including a frame 13 and a first reference element, for instance a router table 5. The router table 5 is used to support a piece of material 3 (for example a piece of wood) to be machined, also referred to as a work piece. A plunge or fixed base router for routing out (hollow out) an area in the face of the piece of material 3 is arranged underneath the router table 5. The router includes a base, the base housing a vertically mounted electric motor with a router collet 7 on the end of its motor shaft. The router collet 7 is arranged to take up a router bit 8, which then extends through an opening in the router table 5. The router table further includes a second reference element, for instance a router fence or guiding fence 6, along which the piece of material 3 is to be guided during the routing out operation. The router table 5 and the router fence 6 determine a working direction and position of the groove to be machined in the piece of material 3. The router fence 6 is movable from back to front of the table along tracks 14 and may be secured to the router table 5 at any desired position. In order to secure the router fence to the router table 5, locking means 15 (schematically shown in FIG. 1) are provided. The router fence 6 is provided with a gap 6a or opening near the position of the router bit, the gap or opening leaving enough room for the work piece to move freely over or along the router bit 8.

When a long edge of a work piece 3 has to be machined, the work piece is positioned on the router table 5 with the long edge to the router fence 6, as shown in FIG. 1a. The work piece is then guided over the router table 5 and along the router fence 6 to the router bit 8 for machining the long edge, the router fence 6 guiding the work piece while the work piece is firmly held.

When a short edge of a work piece 300 has to be machined, holding the board firmly, but in such manner that it can still be moved parallel to the router fence for its edge forming, provides a challenge that existing holding devices have attempted to solve as shown in FIG. 1b by mounting a clamping device 24 on a carrier board 10 for exercising downward pressure on the work piece 300 thus holding the work piece 300 firmly on the carrier board 10. Stops 20 and 22 are provided on the carrier board 10 to keep the work piece 300 in position perpendicular to the router fence 6. The carrier board 10 is then guided over the router table 5 and along the router fence 6 to the router bit 8 for machining the short edge, or end part, of the work piece 300.

Figure 2:
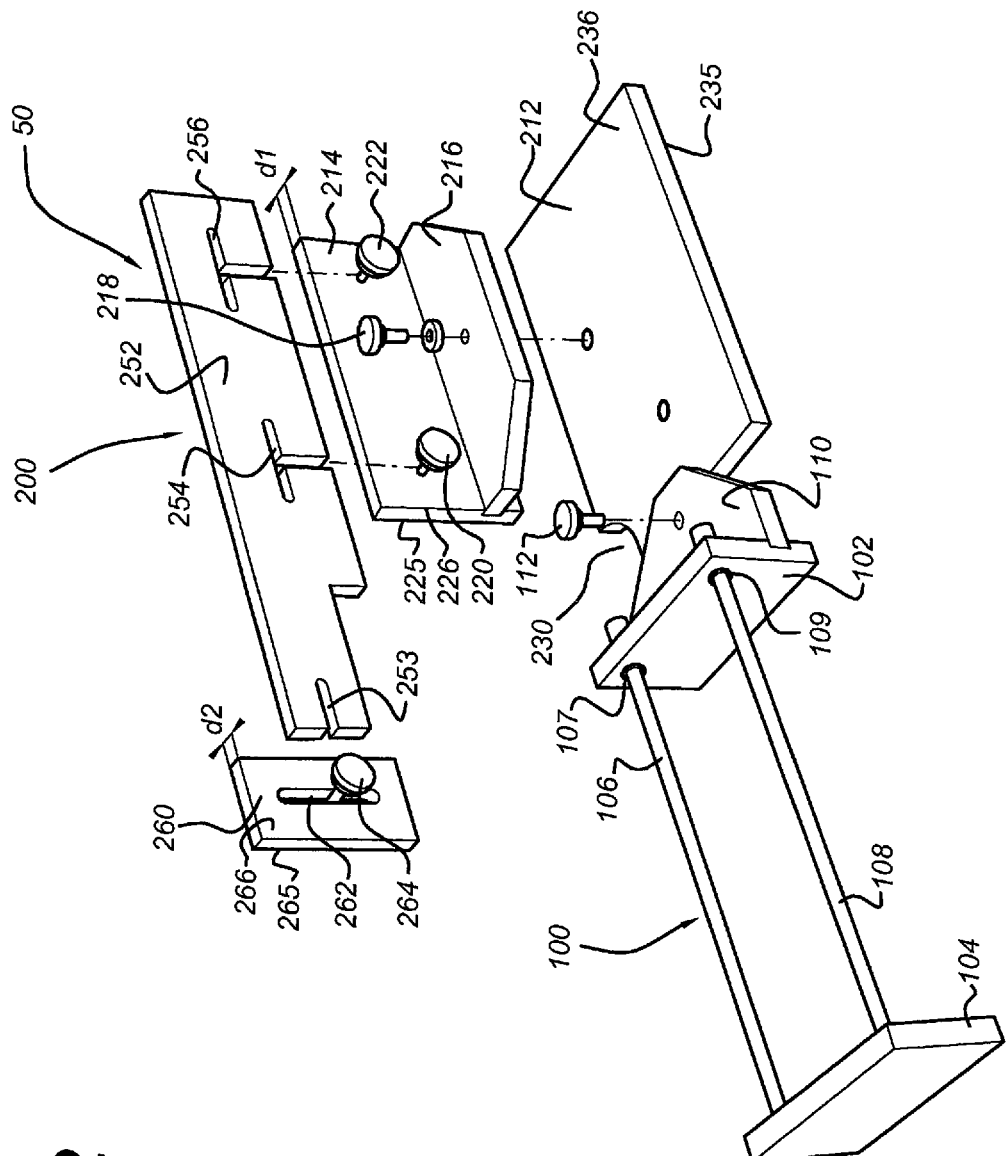
FIG. 2 shows a perspective view of parts of a holding device for holding a work piece in accordance with an embodiment of the present invention.
Figure 3:
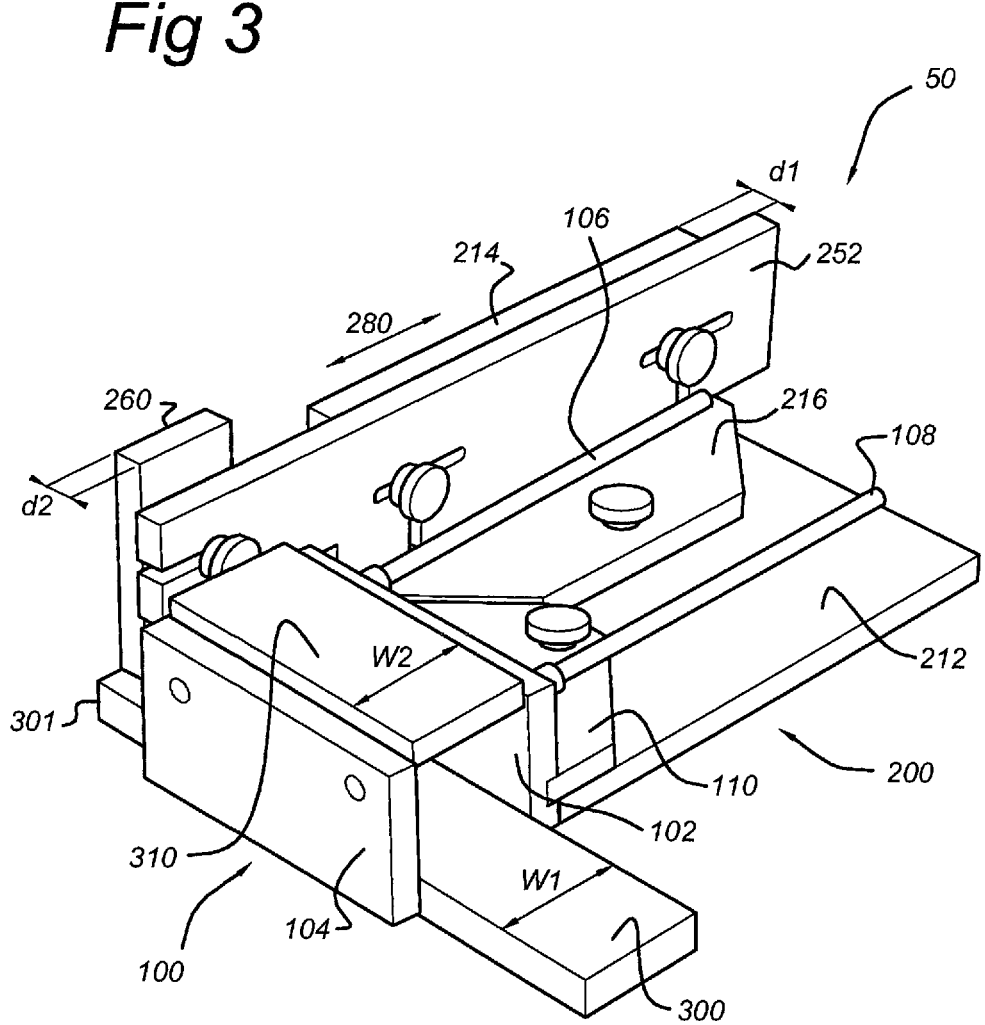
FIG. 3-FIG. 5 show perspective views of an assembled holding device for holding a work piece in accordance with an embodiment of the present invention.
Figure 4:
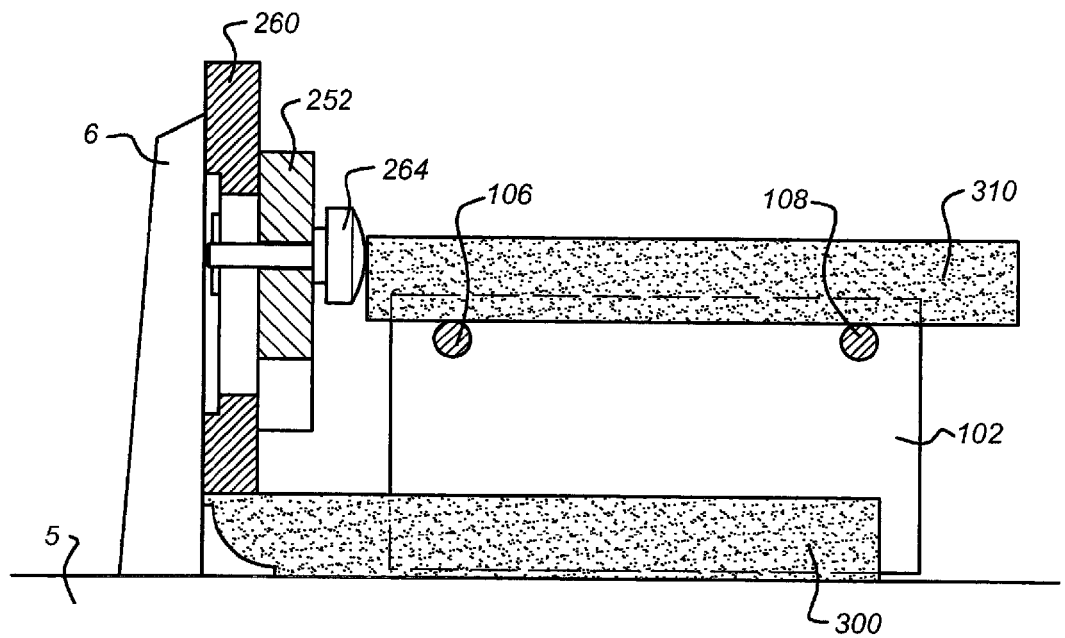
Figure 5:
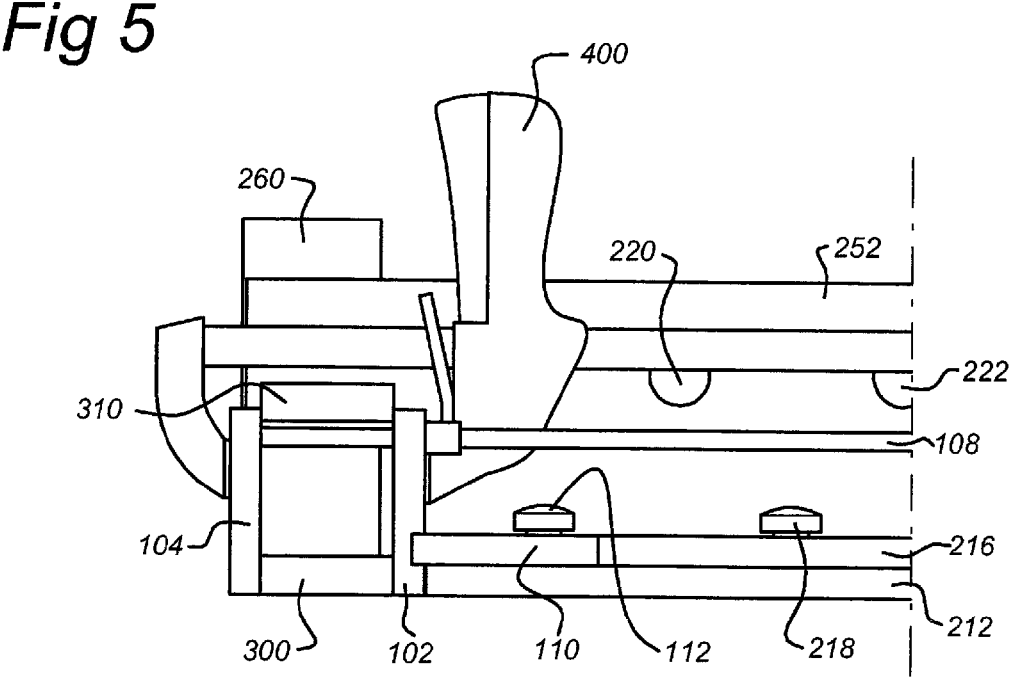

FIG. 2 shows a perspective view of parts of a holding device for holding a work piece in accordance with an embodiment of the present invention. FIG. 3-FIG. 5 show perspective views of an assembled holding device for holding a work piece in accordance with an embodiment of the present invention.

In the shown embodiment, a clamping arrangement 100 and a guiding arrangement 200 are connected to form a holding device 50.

In this exemplary embodiment, the clamping arrangement 100 and the guiding arrangement 200 are assembled from a plurality of parts shown in FIG. 2 and FIG. 3: a vise connector member 110, a vise plate 102, a vise clamp plate 104 and two steel rods 106, 108, a base plate 212, a fence 214, a fence plate 216, a hold-down plate 252, a hold-down end piece 260 and several clamping knobs and washers 112, 218, 220, 222, 264. In this and alternative embodiments, at least some parts may be releasably connected. In embodiments, at least some parts may be permanently connected or even integrated.

The parts of the holding device 50 may e.g. be made of melamine surfaced MDF, plywood or plastic (e.g. glass reinforced Nylon) parts, with steel rods, or extruded aluminium. The choice of materials used is not critical to the concept and operation, provided they are stable and ensure proper integrity of the parts and offer dimensional stability.

In this exemplary embodiment, assembly of the clamping arrangement 100 comprises threading the steel rods 106, 108 into the inside face of the vise clamp plate 104. With the vise clamp plate 104 attached, the steel rods 106, 108 slide into corresponding holes 107, 109 in the vise plate 102, allowing the vise clamp plate 104 to slide freely towards and away from the vise plate 102, while staying parallel to the vise plate 102. The vice connector member 110 is connected to the vise plate 102, and provides a connection to the guiding arrangement 200 with bolt 102 and a corresponding hole.

After assembly, the clamping arrangement 100 thus comprises a first clamping element in the form of the vise plate 102 and a second clamping element in the form of the vice clamp plate 104. The relative orientation between the two clamping elements is maintained by an orientation device in the form of the steel rods 106, 108.

In embodiments, the steel rods 106, 108 are each provided with a thread and corresponding bolts are provided for being threaded on the steel rods 106, 108 to exercise a clamping force in between the vise plate 102 and the vise clamp plate 104 for holding a work piece. The vise plate 102, the vise clamp plate 104, threaded steel rods 106, 108 and bolts thus form a vise for holding the work piece.

In embodiments, the vise plate 102 and the vise clamp plate 104 are arranged to receive and cooperate with an external clamp, such as a hand clamp, wherein the external clamp provides the clamping force in between the vise plate 102 and the vise clamp plate 104 for holding the work piece.

The hold-down plate 252 is slideably connected to the fence 214 using the two threaded clamping knobs 220, 220 and threaded inserts in the fence 214, the clamping knobs being movable in generally T-shaped slots 254, 256. The T-shaped slots are shaped for positioning the hold-down plate 252 relative to the fence 214. The hold-down end piece 260 is held in place by the clamping knob 264 and a corresponding nut, wherein the end piece can be displaced relative to the hold-down plate 252 by the presence of a slot 262 in the end-piece 260 and the slot in the fence 214. The hold-down end piece can be adjusted laterally and vertically, to ensure stability of the holding device against the router fence 6 and to hold down the work piece. Thickness d2 of the hold-down end piece 260 is the same as the thickness d1 of the fence 214, to provide a guiding interface e.g. for guidance along the router fence 6 with back surface 225 of the fence 214 and back surface 265 of the hold-down end piece 260 substantially in contact with the router fence 6.

After assembly, the guidance arrangement 200 thus comprises a first guiding element in the form of the base plate 212, a second guiding element comprising the fence 214 cooperating with the hold-down end piece 260, and a fixation element formed by the hold-down plate 252, the hold-down end piece 260 and the corresponding knobs 220, 222, 264 and slots 254, 256, 262.

The base plate 212 may comprise a clearance 230 serving as a space for the router bit 8 once it has completed its operation.

Assembly of the clamping arrangement 100 to the guidance arrangement 200 is performed by securing onto the base plate 212 both the vise connector member 110, connected to the vise plate 102, and the fence plate 216, with corresponding threaded knobs 112, 118.

Figure 6:
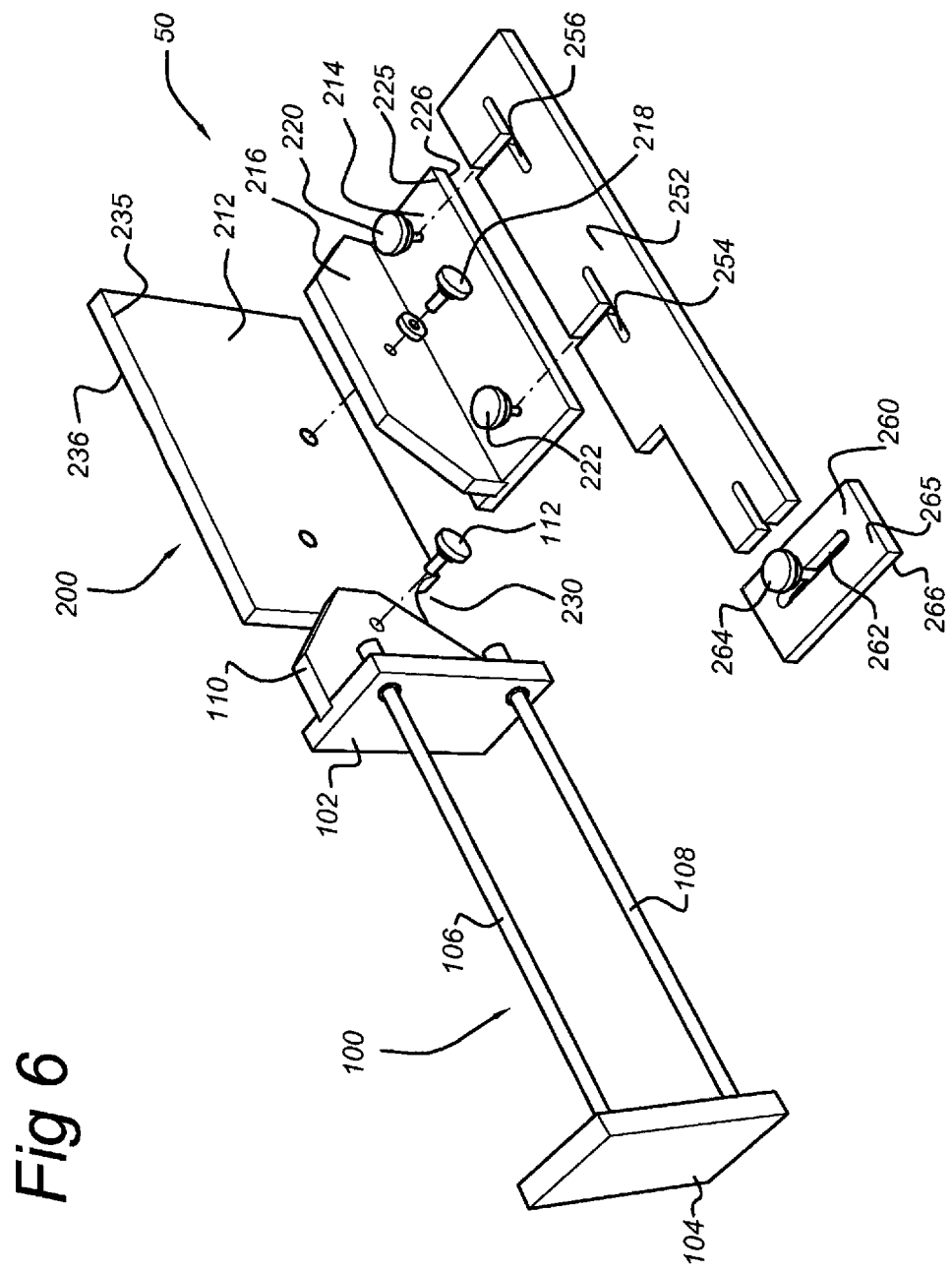
FIG. 6 shows a perspective view of parts of a holding device for holding a work piece in a second orientation in accordance with an embodiment of the present invention.
Figure 7:
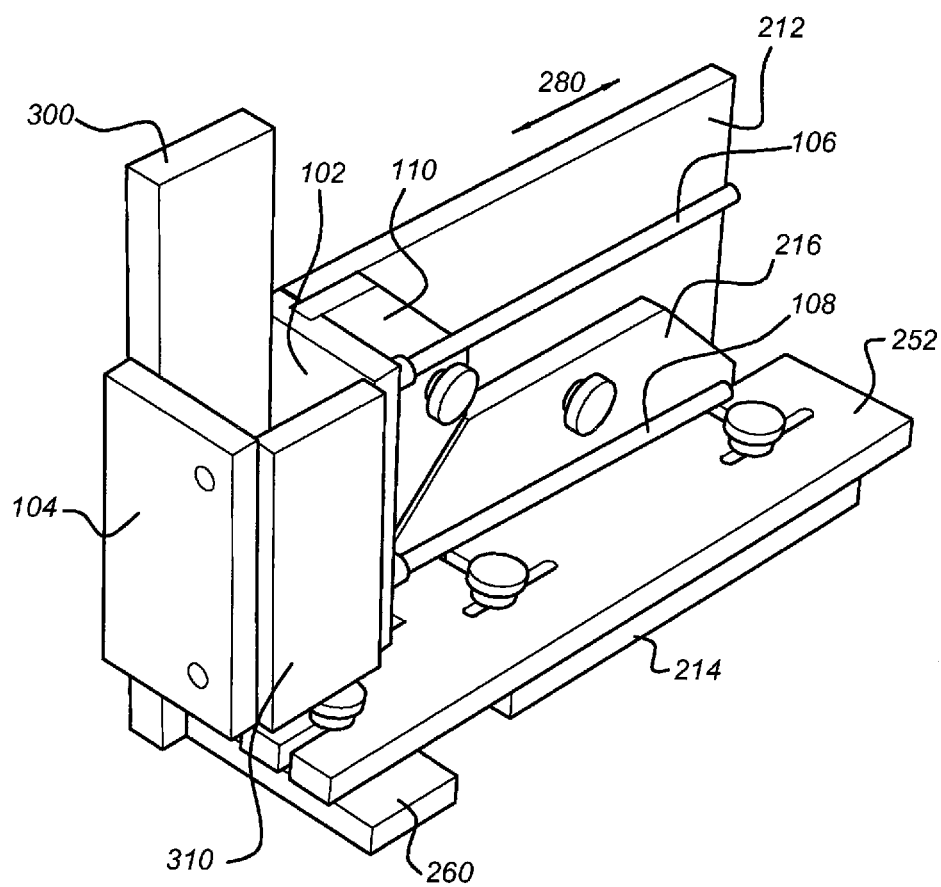
FIG. 7 shows a perspective view of an assembled holding device for holding a work piece in the second orientation in accordance with an embodiment of the present invention.

The layout of the holding device 50 can be inversed, as is shown in FIG. 6 and FIG. 7. The holding device 50 can be reassembled as a mirror image of itself, with the fence plate 216 and the vise plate 102 with the vise connection member 110 attached in reverse direction on the bottom side of the base plate 212. The hold-down plate 252 attaches in reverse direction, with the hold-down end piece 260 re-attached on the reverse side of the hold-down plate 252.

This inversion enabled by a situation of the holes and threads, respectively, of the two clamping knobs in the exact center of the corresponding sides of the base plate 212, while the hold-down plate's 252 attachment slots and the corresponding threaded holes in the fence 214 are symmetrically placed.

The holding device 50 can be operated both horizontally, in a first condition as is shown in FIG. 3-FIG. 5, with its base plate 212 riding on the router table 5 with surface 235, and vertically, in a second condition as is shown in FIG. 6-FIG. 7, with the base plate 212 pressed against the router fence 6 with surface 236.

For horizontal operation, the base plate 212 rests on the router table 5 with surface 235 and keeps the assembly in position, whereas the fence 214 together guides with its surface 225 along the router fence 6, as does the hold-down end piece 260 with its surface 265.

For vertical operation, the fence 214 rests on the router table 5 with surface 226 and keeps the assembly in position, together with the hold-down end piece 260 resting on the router table 5 with surface 266, whereas the base plate 212 guides with its surface 236 along the router fence 6.

As shown in FIG. 3 and FIG. 7, operating holding device 50 is done by introducing the work piece 300 between the vise plate 102 and the vise clamp plate 104 and securing the work piece 300 firmly in place using a clamping force in the lateral direction between the vise plate 102 and the vise clamp plate 104, e.g. using an external clamp such as a hand clamp 400 for providing the clamping force.

In order that the clamping force be exerted without deforming any part of the holding device 50 and/or of the work piece 300, while ensuring that the work piece 300 remains perpendicular to the router fence 6, an auxiliary piece 310 of identical width w2 as the width w1 of the work piece 300 may be placed on top of the steel rods 106, 108.

A substantially perfectly rectangular box is thus created and is held together with the hand clamp 400. The integrity of this rectangular box is ensured by distributing the clamping force substantially evenly by applying the hand clamp 400 providing the clamping force in between the work piece 300 and the auxiliary piece 310.

The rectangular box may have the effect of keeping the work piece securely in place, optionally aided by a non-slip treatment of the inside surfaces of the vise plate 102 and vise clamp plate 104. It may further reduce or even avoid any clamping strain on the holding device 50 itself. Therefore the rectangular box ensures the integrity of the routing operation.

Figure 8:
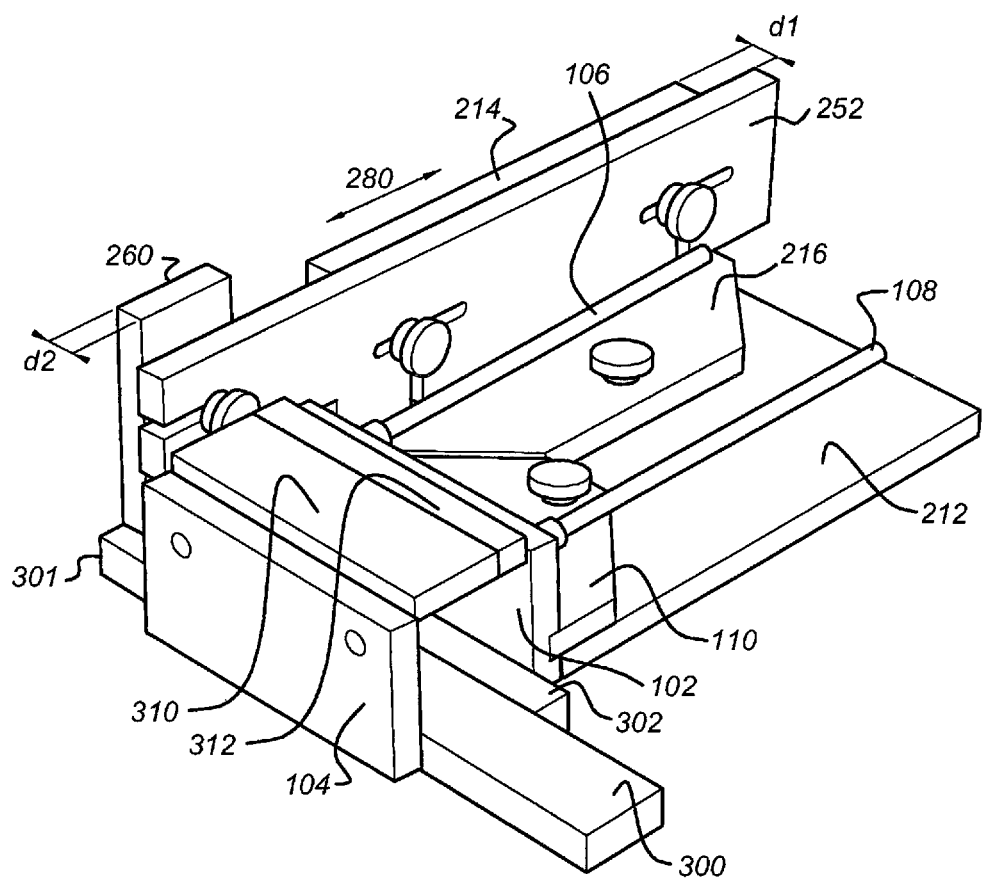
FIG. 8 shows a perspective view of a holding device using a backer board and an auxiliary backer board.

In order to avoid tear-out where the router bit 8 exits the work piece 300 when routing end grain, a sacrificial backer board 302 may be placed behind the work piece 300, i.e. in between the work piece 300 and the vise plate 102, as shown in FIG. 8. The backer board 302 may be a piece of scrap wood of the same thickness of the work piece 300 to be routed. In such operation, the backer board 302 may be duplicated by a auxiliary backer board 312 of identical width in pair with the auxiliary piece 310 for again obtaining a substantially perfectly rectangular box of work piece 300 with backer board 302, auxiliary In FIGS. 9-11 a further embodiment of the present invention is shown. In this embodiment again a clamping arrangement 401 and a guiding arrangement 500 are connected to form a holding device 150.

Figure 9:
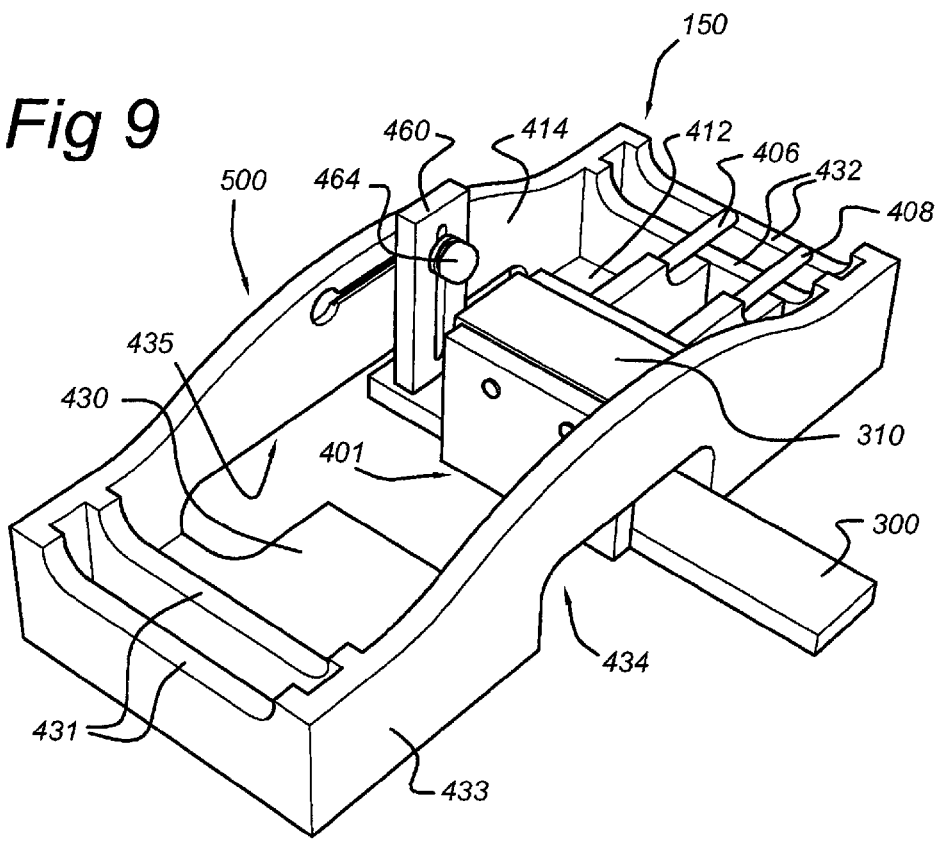
FIG. 9 shows a perspective view of a holding device in accordance with another embodiment of the present invention, in a horizontal mode of operation.

In this exemplary embodiment, the clamping arrangement is assembled from a plurality of parts, for instance a vise plate 402, a vise clamp plate 404 and two steel rods 406, 408, wherein the plates 402,404 in combination with the steel rods 406 form a vise for fixedly clamping a work piece 300 relative to the guiding arrangement 500. The guiding arrangement 500 comprises a base plate 412 attached to the vise plate 402, a fence 414 attached to the base plate 412, and a number of further structural elements for providing the guiding arrangement with sufficient structural strength and integrity. The further structural elements may comprise a further support plate 430 that may be placed on the router table (not shown in the figures) when the device is used in a horizontal mode of operation, side walls 431, 432 and a front wall 433. The bottom portion of the front wall 433 has a clearance or recess 434 extending that is shaped to allow a work piece 300 to pass the front wall, as is shown in FIG. 9. Furthermore the width of the recess 434 is larger than the maximum width of the work piece so that the device can cope with work pieces of different size and/or shape. Similarly, the back wall or fence 414 is provided with a recess 435 to be able to accommodate different sized work pieces 300.

The guiding arrangement 500 further comprises a hold-down piece 460 and a clamping knob 464. The hold-down piece 460 is slideably arranged so that it may be moved upward or downward in order to be able to position the lower edge of the hold-down piece exactly on top of the work piece 300 and/or so that it may be moved in lateral direction in order to be able to position the lower edge of the hold-down piece 46 at a substantially centered location relative to the work piece 300. For instance, if the work piece 300 shown in FIG. 9 is replaced by a larger work piece (having a larger width), the hold-down piece 460 is to be moved laterally to the left in order to keep the hold-down piece 460 centralised relative to the work piece.

In this embodiment a large part of the elements forming the clamping arrangement 401 and the guiding arrangement 500 are essentially permanently connected to one another or even integrated (for instance formed from one piece of injection molded plastic or a similar material). In certain embodiments of the invention the holding device 150 is made of melamine surfaced MDF, plywood or plastic (e.g. glass reinforced Nylon) parts, with steel rods, or extruded aluminium.

As mentioned earlier in connection with the first embodiment of the present invention, the clamping arrangement 401 comprises a first clamping element (for instance the vise plate 402) and a second clamping element (for instance the vice clamp plate 404), that may be moved relative to one another.

In a further embodiment (not shown in the figures) an additional steel rod is arranged between the vise plate 402 and vise clamp plate 404, preferably at a position close to the center of the plates. This additional steel rod is configured so as to exercise a clamping force between the vise plate 402 and the vise clamp plate 404 for holding a work piece 300 and an auxiliary piece 310. To this end the additional rod be threaded. Using one or more bolts the vise clamp plate 404 can be bolted such that the work piece 300 is clampingly held between the vise clamp plate 404 and vise plate 402.

In other embodiments, however, the vise plate 402 and the vise clamp plate 404 are arranged to cooperate with an external clamp, such as the hand clamp 400 shown in FIG. 5. In these embodiments the external clamp provides the clamping force in between the vise plate 402 and the vise clamp plate 404 for holding the work piece 300 and the auxiliary piece 310. The clamp comprises two outer ends that may be placed against the sides of the vise plate 402 and vise clamp plate 404. The clamp is configured to have the outer ends exert an inward force on the plates 402,404 in order to clamp the work piece 300 and the auxiliary piece 310 between the plates 402,404. In a preferred embodiment the outer ends are positioned to engage on the plates 402,404 at a location between the lower work piece 300 and the upper auxiliary piece 310 or, even more preferably, exactly halfway between the lower work piece 300 and the upper auxiliary piece 310. In the shown embodiment this means that the clamp ends engage the plates 402,404 at their respective centers. This location of the ends of the clamp provides for an essentially even distribution of the clamping forces and therefore reduces the occurrence of unwanted stress in the remainder of the clamping arrangement and in the guiding arrangement.

Figure 10:
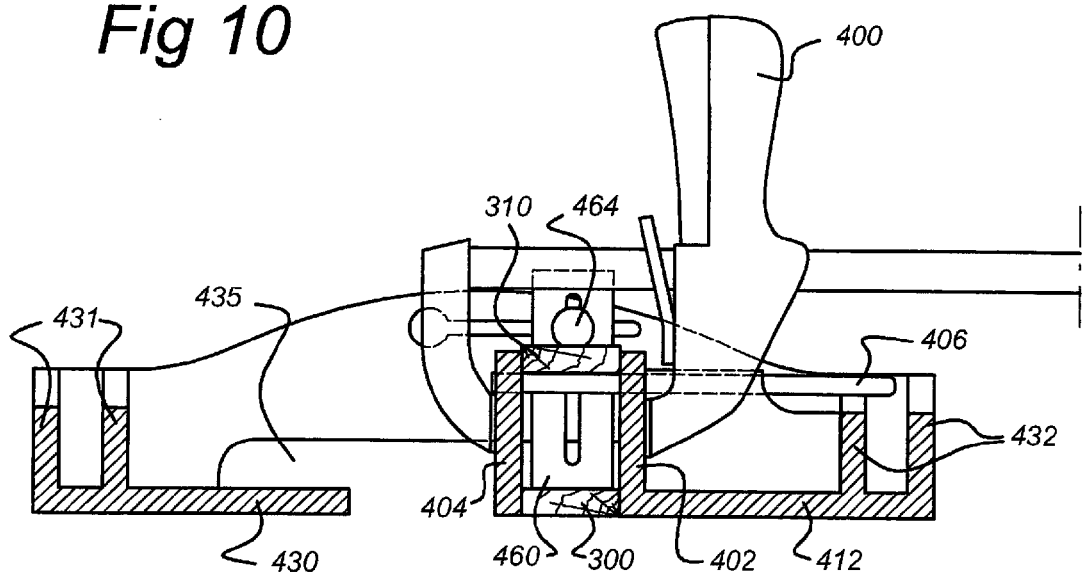
FIG. 10 shows a longitudinal cross-section of the holding device of FIG. 9.
Figure 11:
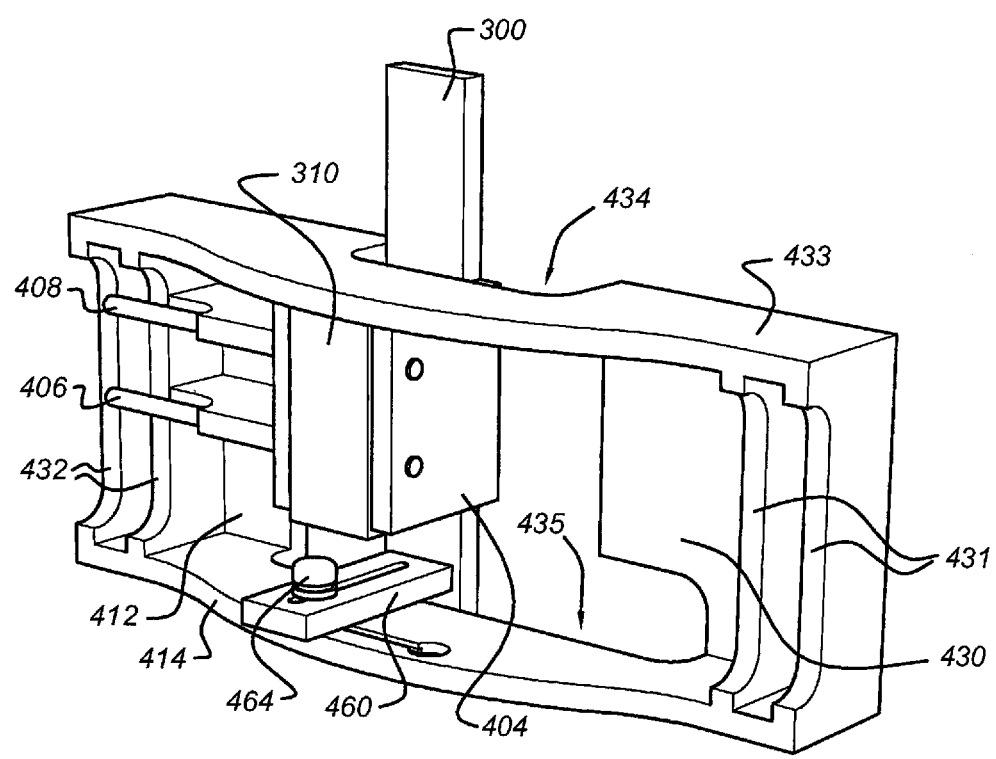
FIG. 11 shows a perspective view of the embodiment of the holding device of FIGS. 9 and 10.

Referring to FIGS. 9 and 10, for horizontal operation, the base plate 412 rests on the router table 5, whereas the fence 414 extends essentially perpendicular to the router table surface and guides with its outer surface along the router fence 6. Referring to FIG. 11, for vertical operation, the fence 414 rests on the router table 5 and the base plate 412 extends essentially perpendicular to the router table surface and guides with its outer surface along the router fence 6.

One of the advantages of the embodiments of FIGS. 8-11 is that no disassembling and reassembling is needed whenever the mode of operation changes between the vertical mode of operation and the horizontal mode of operation. Furthermore, these embodiments enable a more efficient manufacturing process of the system and are relatively easy to use.

In a further embodiment the first and second clamping elements are arranged to be moveable relative to one another, wherein an external clamp engages on the first and second clamping element and applies a force on the first and second element causing the first and second element to be urged towards each other. This has the effect that a work piece arranged between the first and second clamping element can be clampingly held by the holding device. In a further embodiment the clamp engages the holding device only on the outer surfaces of the first and second clamping element. Because the clamp only engages on the clamping elements and no further connection or engagement with other parts of the holding device are present, deformations in the holding device as a result of the stress caused by the clamping force can be avoided or at least reduced. This may improve the accuracy of the routing process.

Referring to FIGS. 12-21, there is shown a further embodiment of a holding device in accordance with the present invention, generally indicated at 500. Holding device 500 comprises a first side plate 502, a second side plate 504, a first clamping plate 506, and a second clamping plate 508. All of the first and second side plates 502, 504, and first and second clamping plates 506, 508 preferably are made of metal. It will be understood, however, that they may be made of any other suitable material, such as plastic.

First and second side plates 502, 504 and first and second clamping plates 506, 508 are disposed in parallel spaced-apart arrangement with first and second clamping plates 506, 508 being positioned between first and second side plates 502, 504. The relative orientation between first and second side plates 502, 504 and first and second clamping plates 506, 508 is maintained by an orientation device. The orientation device as disclosed herein comprises a connector member that secures plates 502, 504, 506, and 508 together. In particular, the connector member comprises a first rod 510, a second rod 512, a third rod 514, and a hold-down rail 516. First, second and third rods 510, 512, 514 extend between first and second side plates and retain first and second side plates 502, 504 in a fixed orientation relative to each other. First, second and third rods 510, 512, 514 preferably are fixedly secured to each of first and second side plates 502, 504 by any suitable means, such as by way of an adhesive or by fasteners (not shown). First, second and third rods 510, 512, 514 are not fixedly secured to first and second clamping plates 506, 508. Instead, first and second clamping plates 506, 508 are able to slide laterally along first, second and third rods 510, 512, 514 toward and away from first and second side plates 502, 504.

Figure 16:
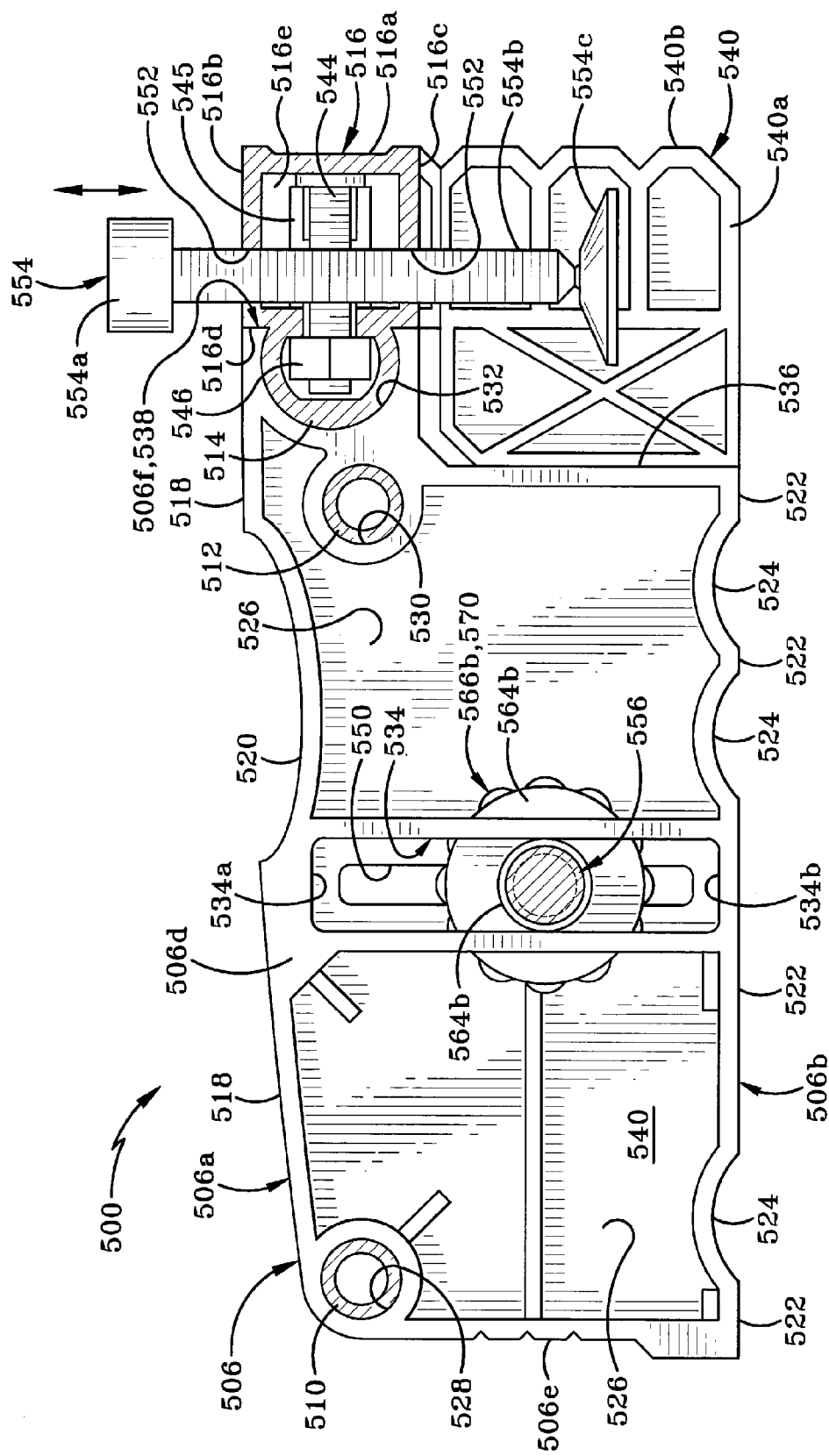
FIG. 16 is a cross-sectional left side view of the holding device taken along line 16-16 of FIG. 15.
Figure 17:
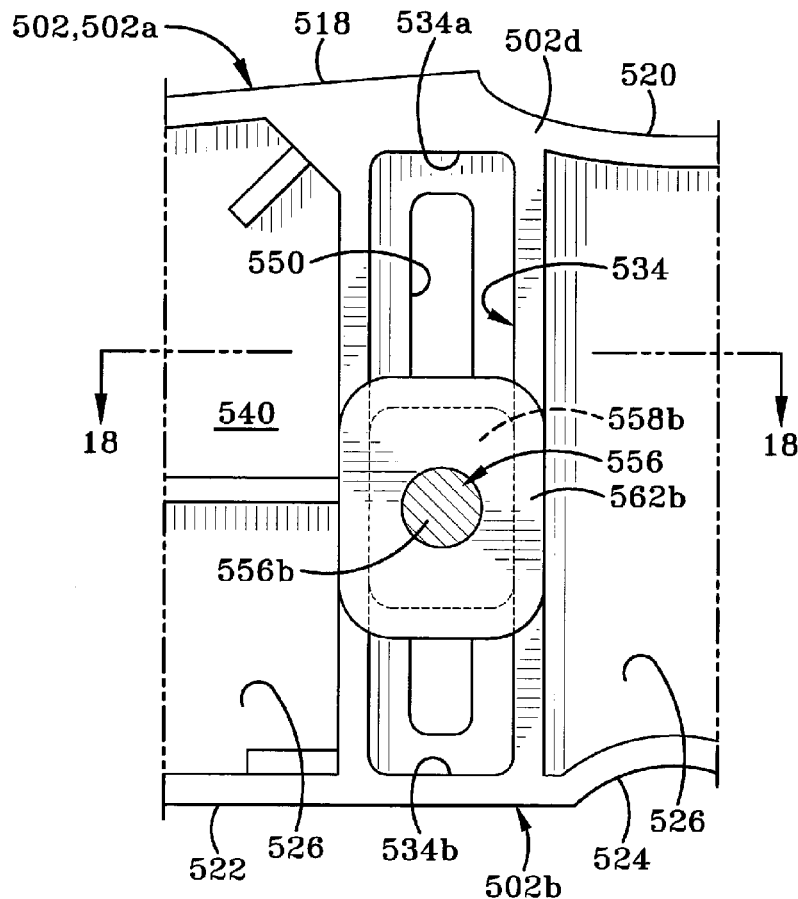
FIG. 17 is a cross-sectional left side view of the second mounting member engaged in the vertical slot in the first side plate and taken along line 17-17 of FIG. 13.
Figure 18:
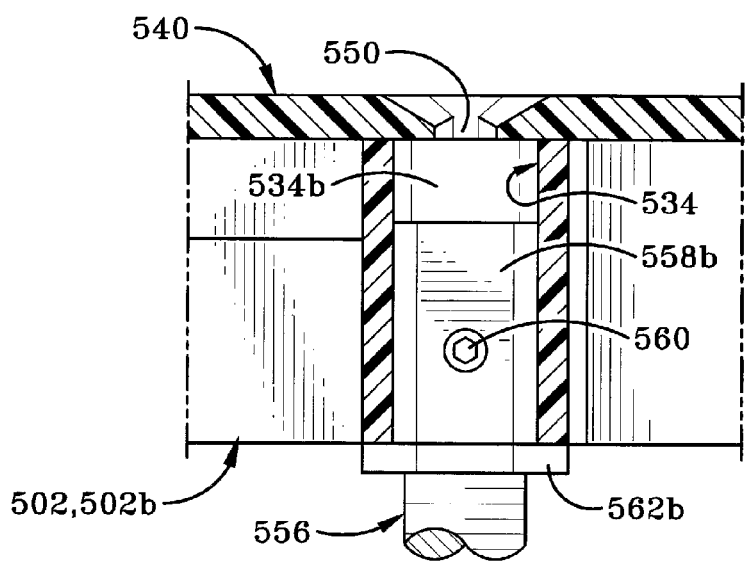
FIG. 18 is a cross-sectional top view of the second mounting member engaged in the vertical slot in the first side plate and taken along line 18-18 of FIG. 17.
Figure 19:
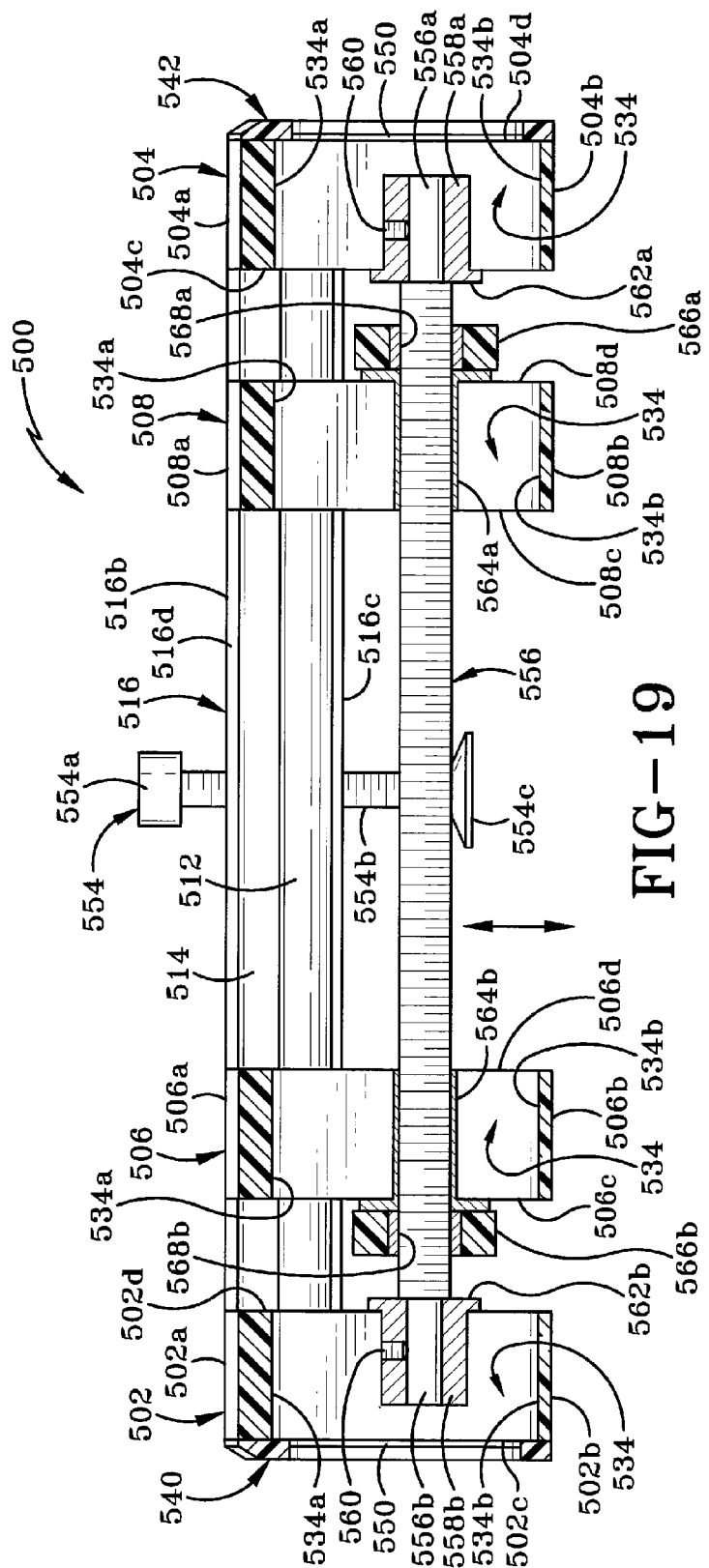
FIG. 19 is a cross-sectional rear view of the holding device taken along line 19-19 of FIG. 13.

Hold-down rail 516 secures first and second side plates 502, 504 and first and second clamping plates 506, 508 together. Rail 516 is positioned adjacent third rod 514 and preferably is integrally formed therewith (FIG. 16). Alternatively, rail 516 and third rod 514 may be separate components that are secured together by a suitable means. Rail 516 includes a first end face 516a, an upper face 516b, a lower face 516c and a second end face 516d. First end face, upper face, lower face, and second end face 516a-516d bound and define a cavity 516e. Third rod 514 preferably is integrally formed with second end face 516d of rail 516. Rail 516 extends between first and second side plates 502, 504 and preferably is fixedly secured thereto as will be later described herein.

First and second side plates 502, 504 and first and second clamping plates 506, 508 are all substantially identical in structure and function. First clamping plate 506 will be described in detail herein but it will be understood that all of plates 502, 504, and 508 include the same components that are numbered in generally similar fashion.

First clamping plate 506 is generally rectangular in shape and includes a first surface 506a, a second surface 506b (FIG. 14), a first side surface 506c, a second side surface 506d, a second end 506e and a first end 506f. First surface 506a is generally an open M-shape and includes a pair of ridges 518 which are separated by a valley 520. Second surface 506b (FIG. 14) includes a plurality of planar regions 522 and depressions 524 that extend from first side surface 506c to second side surface 506d. Second surface 506b further defines a hole 525 therein that is oriented at right angles thereto. Although not illustrated herein, it will be understood that holes 525 on first and second side plates 502, 504 and first and second clamping plates 506, 508 are provided to receive fasteners therein in order to secure a miter slider (not shown) onto holding device 500. The miter slider is then engageable in a miter slot on a router table in order to enable holding device 500 to be used to perform parallel routing without using a router fence. It will be understood that the second surfaces of the plates 502, 504, 506, 508 may be formed without all of the depressions 524 that are shown in the attached figures to make it easier to attach a miter slider to holding device 500.

First and second side surfaces 506c, 506d of first clamping plate 506 are generally parallel to each other. A plurality of apertures 526 is defined in the first clamping plate 506 to reduce the overall weight of holding device 500. Each aperture 526 extends from first side surface 506c through to second side surface 506d.

First clamping plate 506 further includes first, second and third regions (not numbered) which extend between first side surface 506c and second side surface 506d. Each of these first, second and third regions respectively defines a first hole 528 a second hole 530, and a third hole 532 therein. Each of the first, second and third regions is located a short distance inwardly from first surface 506a and is substantially complementary in overall shape to the hole defined therein, although this is not essential. Each of the first, second, and third holes 528, 530, 532 extends from first side surface 506c through to second side surface 506d of first clamping plate 506. Holes 528, 530, 532 are each configured to be complementary shaped and sized to the respective one of first, second, and third rods 510, 512, 514. First and second holes 528, 530 and first and second rods 510, 512 are of substantially the same diameter, while third hole 532 and third rod 514 are of a substantially greater diameter than first and second holes 528, 530 and rods 510, 512. Each of first and second holes 528, 530 is substantially circular in cross-sectional shape. First hole 528 is configured to receive a portion of first rod 510 therein and second hole 530 is configured to receive a portion of second rod 512 therein. Third hole is substantially C-shaped and is configured to receive a portion of third rod 514 therein. As is evident from FIG. 12, first, second, and third rods 510, 512, 514 extend through aligned first holes 528, second holes 530 and third holes 532 in all of first and second side plates 502, 504 and first and second clamping plates 506, 508. Thus, first and second side plates 502, 504 and first and second clamping plates 506, 508 are secured together as a unit by rods 510, 512, 514 and by rail 516. First and second side plates 502, 504 are in a fixed orientation relative to first, second, and third rods 510, 512, 514, and relative to rail 516. First and second clamping plates 506, 508 are movably engaged with all of first, second, and third rods 510, 512, 514 and thereby with rail 516. Thus, the orientation of first and second clamping plates 506, 508 relative to rods 510, 512, 514 and rail 516 is selectively variable.

As shown in FIG. 16 and in accordance with a specific feature of the present invention, first clamping plate 506 further defines a substantially elongated slot 534 therein. Slot 534 extends between first and second side surfaces 506c, 506d of first clamping plate 506 and is disposed in a location situated between first hole 528 and second hole 530. Slot 534 originates a short distance inwardly from first surface 506a and terminates a short distance inwardly from second surface 506b. Slot 534 has first and second ends 534a, 534b and the purpose of slot 534 will be described later herein.

Second end 506e of first clamping plate 506 is oriented generally at right angles to first and second side surfaces 506c, 506d and may include a plurality of small ridges and valleys which are not specifically identified herein. First end 506f of first clamping plate includes a first face 536 (FIG. 16) that is generally planar and disposed substantially parallel to second end 506e. First end 506f further includes a second face 538 that is generally L-shaped, having a horizontal section that originates in first face 536, and a vertical section that is parallel to first face 536 and defines C-shaped third hole 532 therein.

In accordance with a specific feature of the present invention, a first side cap 540 is engaged with first side plate 502 and a second side cap 542 is engaged with second side plate 504. In particular, first side cap 540 is snap-fittingly engaged with first side surface 502c of first side plate 502; and second side cap 542 is snap-fittingly engaged with second side surface 504d of second side plate 504. First and second side caps 540, 542 serve both to stabilize holding device 500, especially when it is used in a vertical position, as will be described hereafter. First and second side caps 540, 542 pose little to no threat to the router bit's cutters if first and second side caps 540, 542 are accidentally contacted by the cutters during routing operations. First and second end caps 540, 542 may be easily and inexpensively replaced if they do become damaged during use of holding device 500.

Figure 12:
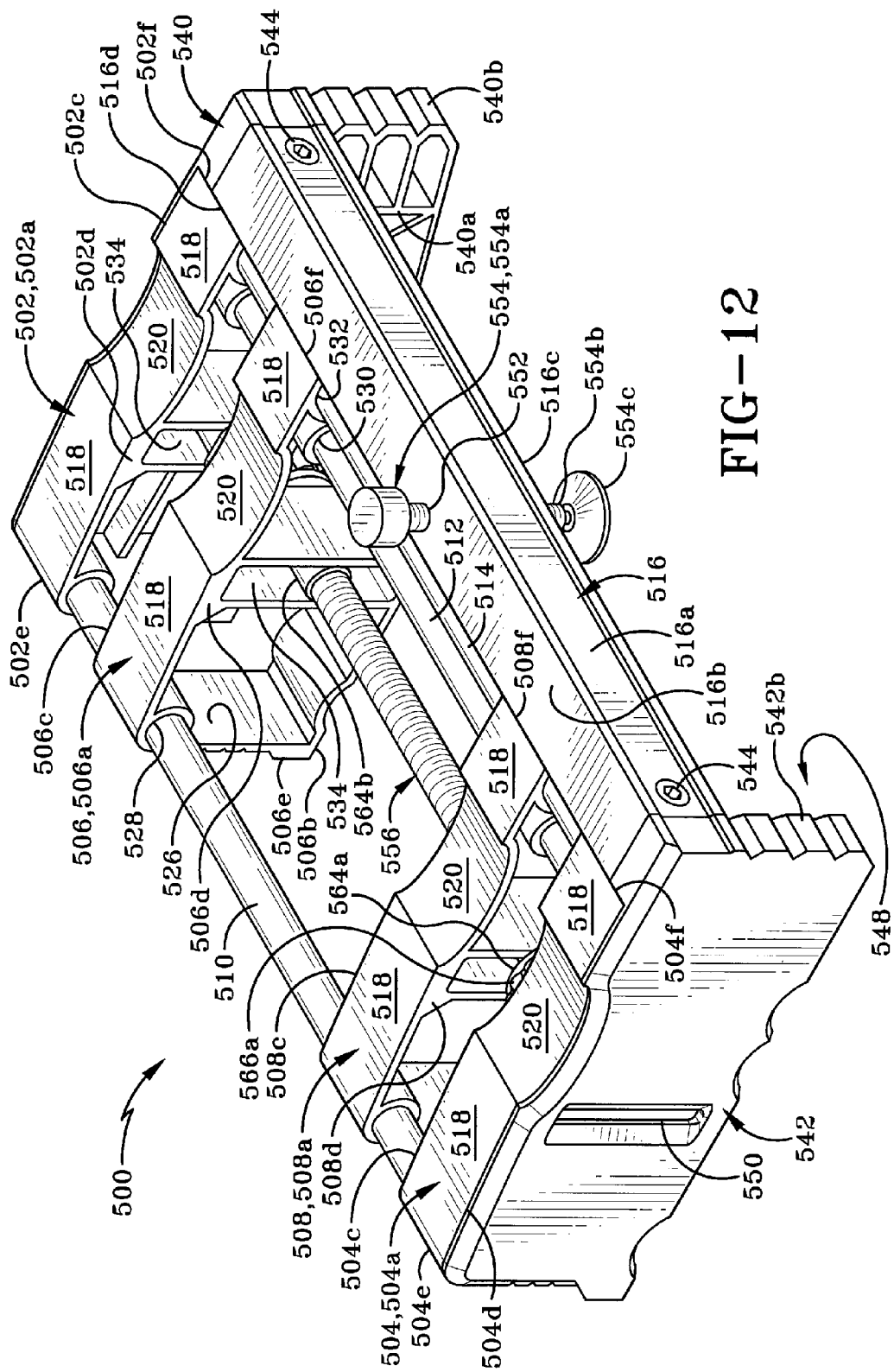
FIG. 12 is a perspective view of a further embodiment of the holding device in accordance with the present invention.

As is best seen in FIG. 12, first side cap 540 matingly engages with first side plate 502 and runs along the first side surface 502c thereof from first end 502f to second end 502e thereof. A region 540a of first side cap 540 extends outwardly and forwardly beyond first end 502f of first side plate 502. Second side cap 542 matingly engages second side plate 504 and runs along second side surface 504d thereof from first end 504f to second end 504e thereof. A region 542a of second side cap 542 extends outwardly and forwardly beyond first end 504f of second side plate 504. Hold-down rail 516 is secured to first and second side plates 502, 504 between regions 540a and 542a of first and second side caps 540, 542 by way of bolts 544. FIG. 16 shows that a pair of tangs 545 extend from first side cap 540 into cavity 516e of rail 516 and clampingly engage a shaft of bolt 544. A nut 546 secures each bolt 544 in place. Nut 546 is received within the bore (not numbered) of third rod 514. Tangs 545, a bolt 544 and a nut 546 secure rail 516 to second side plate 504, as is shown in FIG. 22.

Figure 13:
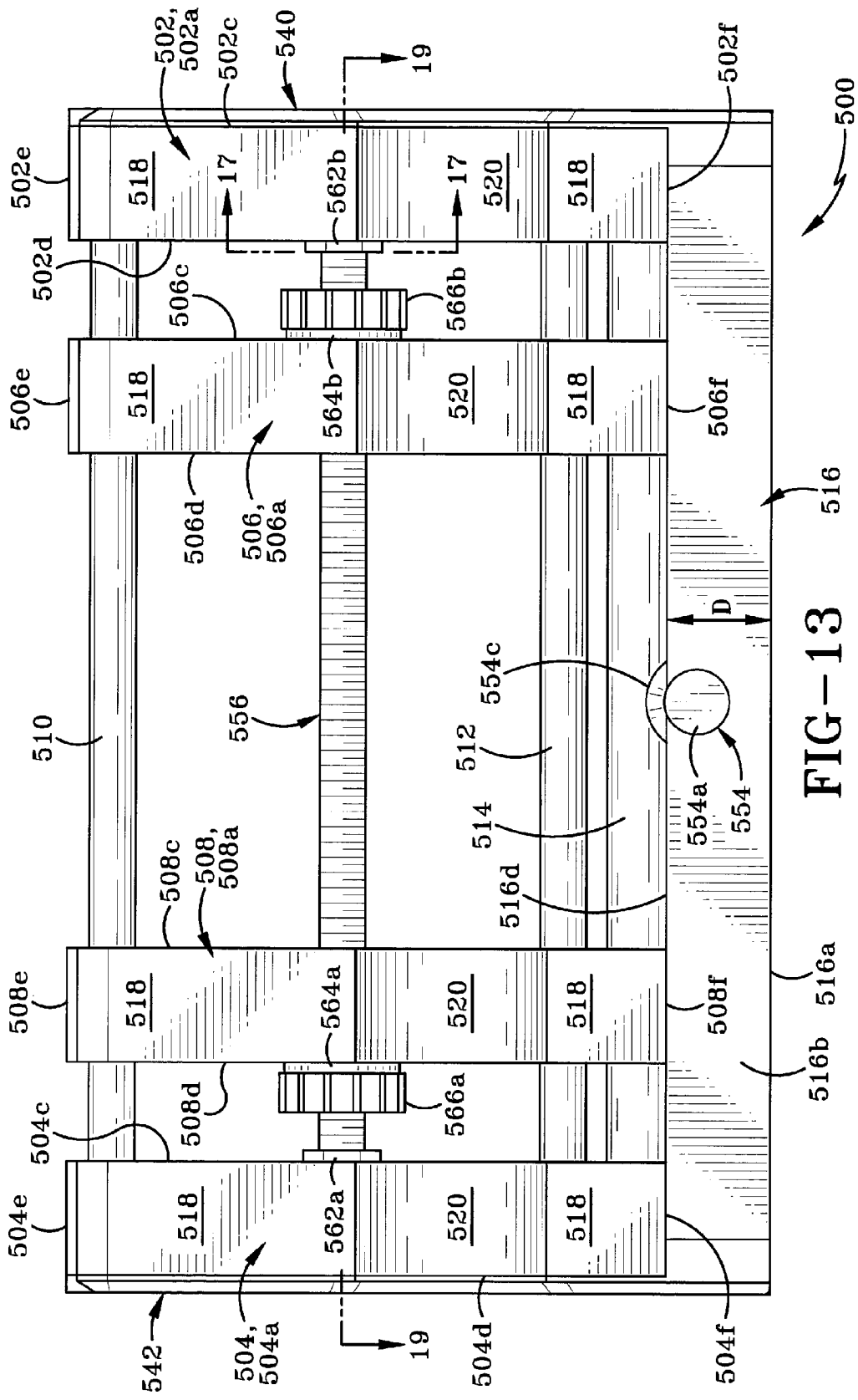
FIG. 13 is a top view of the holding device shown in FIG. 12.
Figure 14:
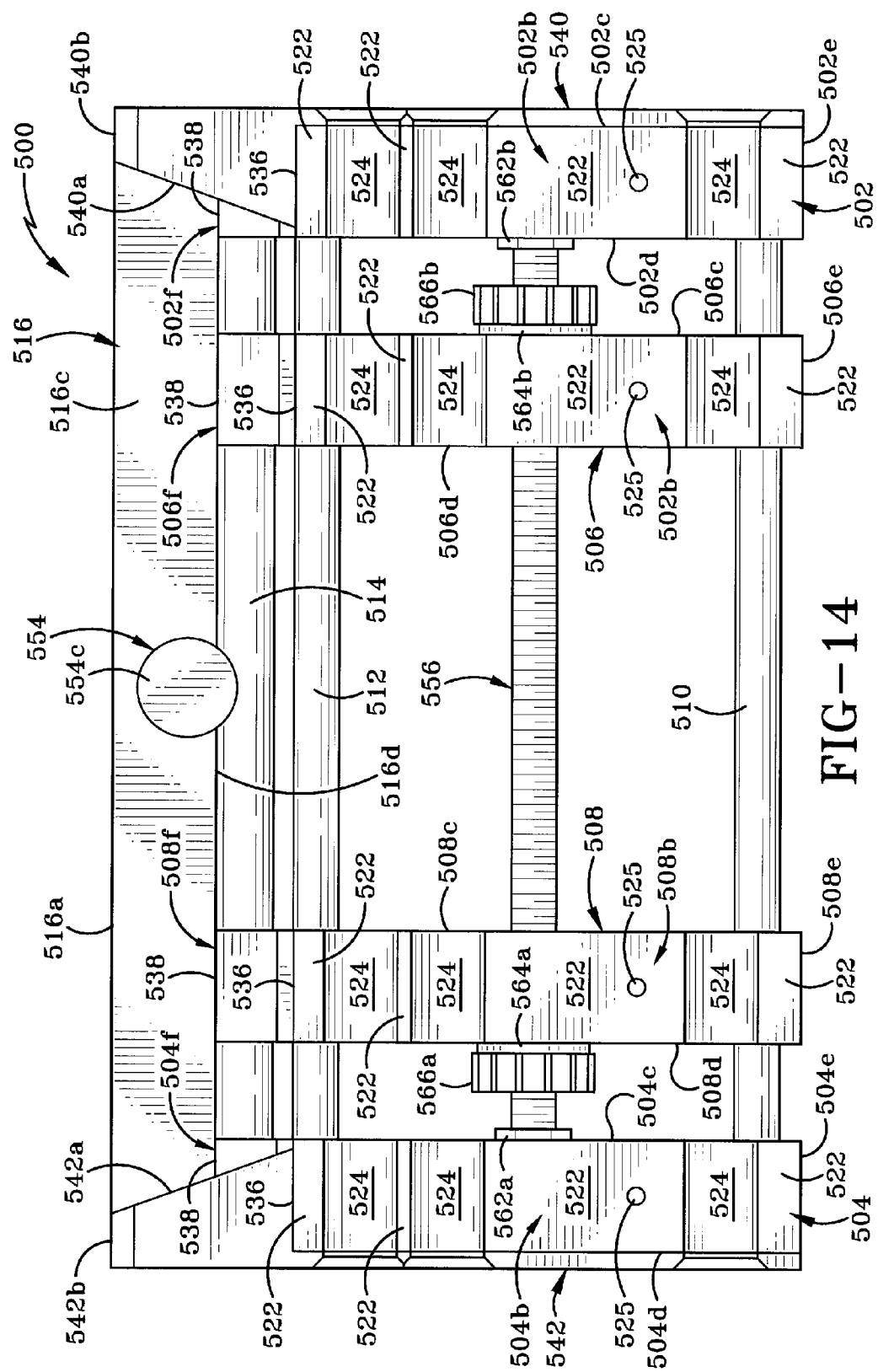
FIG. 14 is a bottom view thereof.

In accordance with a specific feature of the present invention and as is best seen in FIG. 14, regions 540a, 542a of first and second side caps 540, 542 project for a distance beyond the planar regions 536 of the first ends 502f, 504f of first and second side plates 502, 504. These regions 540a, 542a are tapered in a direction away from planar regions 536 and toward the end surfaces 540b, 542b of first and second side caps 540, 542. End surfaces 540b, 542b are substantially aligned with first end face 516a (FIG. 12) of hold-down rail 516. This arrangement causes the first ends 506f, 508f of first and second clamping plates 506, 508 to be spaced a distance "D" (FIG. 13) inwardly from the first end face 516a of hold-down rail 516. Thus, a work cavity 548 (FIG. 12) is defined between those regions 540a, 542a of first and second side caps 540, 542 that extend beyond first ends 502f, 504f of first and second side plates 502, 504, and the first ends 506f, 508f of first and second clamping plates 506, 508.

As indicated previously, first and second side caps 540, 542 preferably snap fittingly engage the outer surfaces 502c, 504d of first and second side plates 502, 504. First and second side caps 540, 542 may alternatively be secured to first and second side plates 502, 504 by adhesive or any other suitable means. First and second side caps 540, 542 each define an aperture 550 therein that is generally aligned with slots 534 when the side caps are engaged with first and second side plates 502, 504. Aperture 550 is of generally the same height as slot 534 but is narrower in width.

Figure 15:
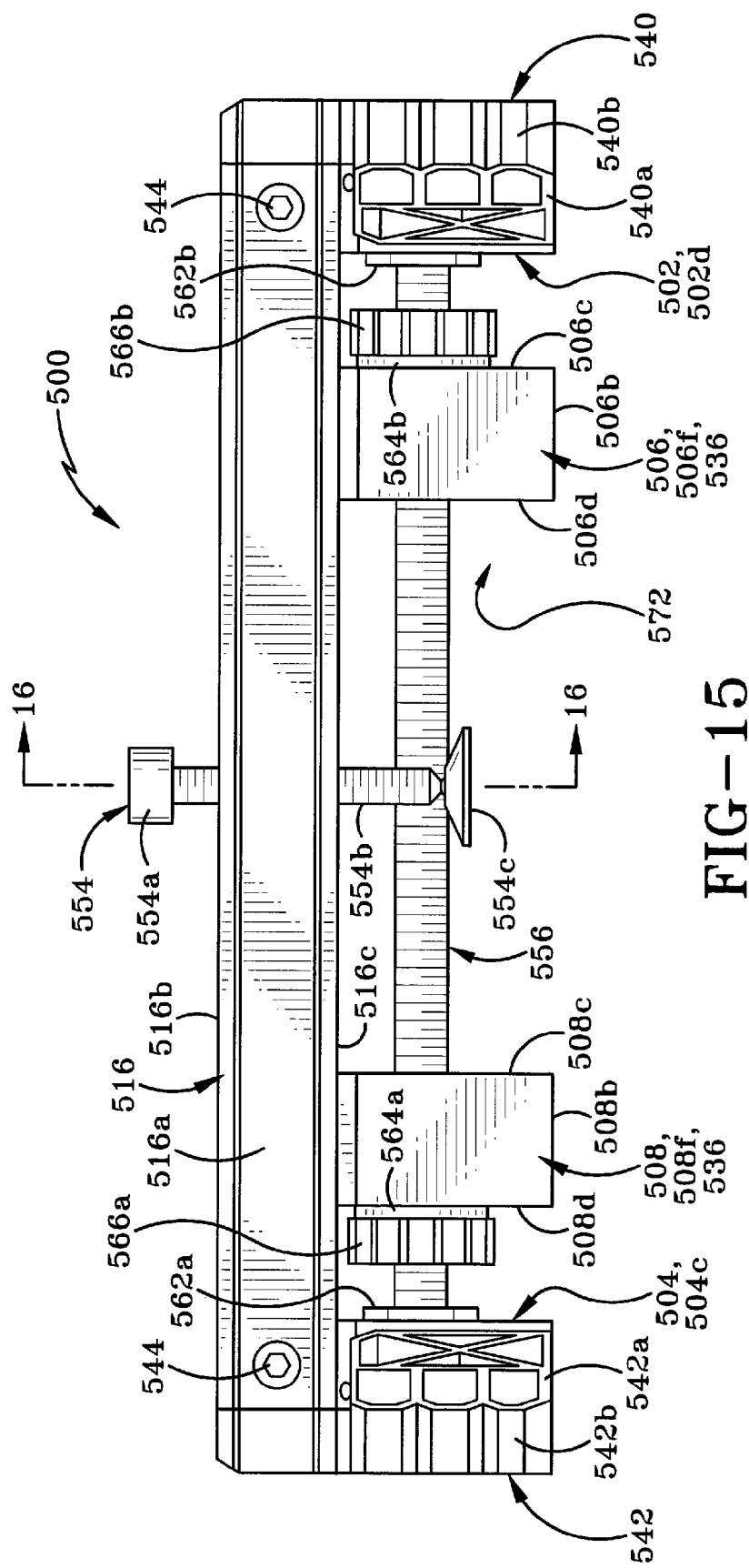
FIG. 15 is a front view thereof.

In accordance with yet another feature of the present invention, hold-down rail 516 further defines a threaded aperture 552 (FIG. 16) therein which extends from first surface 516b to second surface 516c thereof. Aperture 552 is located centrally along hold-down rail 516 and most particularly between the first and second clamping plates 506, 508. A clamping element 554 is received through aperture 552. Thus, clamping element 554 is in a fixed position on hold-down rail 516 and is in a location that is intermediate first and second clamping plates 506, 508. As shown in FIG. 15, clamping element 554 includes a head 554a, a threaded shaft 554b, and a protective cap 554c with head 554a being at a first end of shaft 554b and cap 554c being engaged with a second free end of shaft 554b. Protective cap 554c may be omitted if desired. When clamping element 554 is rotated in a first direction, cap 554c or the free end of clamping element 554 (not shown) moves downwardly away from second surface 516c of hold-down rail 516. When clamping element 554 is rotated in a second direction, cap 554c or the free end of clamping element 554, moves upwardly toward second surface 516c of hold-down rail 516. The purpose of clamping element 554 will be further described herein.

In accordance with yet another feature of the present invention, holding device 500 further includes an activation assembly for moving first clamping plate 506 towards second clamping plate 508; and for moving second clamping plate 508 towards first clamping plate 506. Preferably, activation assembly moves both of the first and second clamping plates 506, 508 laterally towards and away from each other. The activation assembly comprises a rod 556, a first knob 566a and a second knob 566b. The activation assembly preferably further includes a first spacer 564a (FIG. 13) and a second spacer 564b.

Rod 556 extends between at least first and second clamping plates 506, 508. Preferably, rod 556 extends from first side plate 502, through regions of first and second clamping plates 506, 508, and to second side plate 504. Rod 556 preferably is fixedly engaged with first and second side plates 502, 504 and is movably engaged with first and second clamping plates 506, 508. In particular, rod 556 is threaded and extends through the aligned slots 534 of the first and second side plates 502, 504 and first and second clamping plates 506, 508. Rod 556 has a first end 556a (FIG. 19) and a second end 556b. First and second ends 556a, 556b are not threaded and are of a smaller diameter than the rest of rod 556. A first mounting member 558a is disposed concentrically around first end 556a of rod 556 and a second mounting member 558b is disposed concentrically around second end 556b of rod 556. Each of the first and second mounting members 558a, 558b comprises a generally circular washer region 562a, 562b and a generally rectangular region. The washer region is positioned adjacent the respective side surface 502d, 504c of first and second side plates 502, 504. The rectangular regions are positioned within slots 534. The washer regions 562a, 562b are of greater diameter than the width of the rectangular regions, i.e., than the width of slot 534. First and second mounting members 558a, 558b are secured to first and second ends 556a, 556b of rod 556 by set screws 560.

As indicated above, the activation assembly preferably further includes a first spacer 564b and a second spacer 564a which are concentrically engaged around rod 556 in a location intermediate first and second ends 556a, 556b. First spacer 564b is positioned to engage first mounting plate 506. Second spacer 564a is positioned to engage second mounting plate 508. First and second spacers 564b, 564a are substantially identical but are engaged with first and second clamping plates 506, 508 in a mirrored arrangement. A first region of each of the first and second spacers 564b, 564a is generally rectangular in cross-sectional shape and a second region thereof is generally circular in cross-sectional shape. The rectangularly-shaped regions are disposed within slot 534 of the respective one of first and second mounting plates 506, 508, and each rectangularly-shaped region has a width that is generally equal to the width of slot 534. It will be noted however that the width of the rectangularly-shaped regions may be smaller than the width of slots 534 without departing from the scope of the invention. The circularly-shaped regions form washers that are disposed adjacent one of the first and second side surfaces of the associated first and second clamping plates 506, 508. The diameter of the circularly-shaped washer regions is greater than the width of slots 534. Thus, the washer regions cannot pass through slots 534. The washer region of first spacer 564b is situated between first side plate 502 and first clamping plate 506. The washer region of second spacer 564a is situated between second side plate 504 and second clamping plate 508.

Specifically, first spacer 564b is positioned adjacent first side surface 506c of first clamping plate 506 and a spaced distance from second side surface 502d of first side plate 502. Second spacer 564a is positioned adjacent second side surface 508d of second clamping plate 508 and a spaced distance from first side surface 504d of second side plate 504. The positioning of the washer regions intermediate the outer side surfaces 506c and 508d of first and second clamping plates 506, 508 is shown in FIG. 13. The washer region of first spacer 564b is positioned so that it assists in pushing first clamping plate 506 towards second clamping plate 508 when the activation assembly is engaged in a first instance, as will be described hereafter. The washer region of spacer 564a is positioned so that it assists in pushing second clamping plate 508 towards first clamping plate 506 when the activation assembly is engaged in the first instance. When first and second clamping plates 506, 508 are moved laterally toward each other they each slide along rod 556 and along first, second and third rods 510, 512, 514. The engagement of the clamping plates with all of these rods ensures that the lateral movement is smooth and that the first and second clamping plates 506, 508 do not become angled relative to each other during the movement. Most particularly, during the lateral movement, the first and second clamping plates 506, 508 are maintained substantially parallel to each other.

When the activation assembly is engaged in the second instance, as will be hereinafter described, the user can move first and second clamping plates 506, 508 apart, thereby moving first and second clamping plates laterally away from each other and causing them to slide along rod 556 and along first, second, and third rods 510, 512, 514. Again, the engagement of the clamping plates with the various rods ensures that the plates 506, 508 are kept substantially parallel to each other during lateral movement away from each other. It will be understood that another larger diameter washer region may be provided on the side of each of first and second spacers 564b, 564a opposite the illustrated washer regions. The provision of an additional spacer would aid in moving the associated one of the clamping plates. Additionally or alternatively, the rectangularly-shaped regions may be secured to the associated one of the first and second clamping plates 506, 508 by a set screw in a similar fashion to the engagement of the rectangularly-shaped regions of first and second mounting members 558a, 558b and first and second side plates 502, 504.

As indicated previously, the activation assembly further comprises first knob 566b disposed between first side plate 502 and first clamping plate 506; and second knob 566a disposed between second side plate 504 and second clamping plate 508. Each of the first and second knobs 566b, 566a defines a threaded aperture 568b, 568a therein, respectively, and through which rod 556 passes. First and second knobs 566b, 566a each further include a knurled exterior surface 570 (FIG. 16). When knobs 566b, 566a are rotated in one of a first and second direction, first and second clamping plates 506, 508 are moved toward each other. When knobs 566b, 566a are rotated in the other of the first and second direction, first and second clamping plates 506, 508 are able to be moved away from each other. As indicated previously, the user can physically push first and second clamping plates 506, 508 apart. First and second spacers 564b, 564a are not threaded and preferably are made from a smooth-finished plastic that permits the spacer to glide along rod 556. It will be noted that first and second knobs 566b, 566a may have to be rotated in opposite directions from each other around rod 556 in order to move the respective first and second clamping plates 506, 508 toward and away from each other. It will further be understood that first and second knobs 566b, 566a may be operationally engaged with first and second spacers 564b, 564a so that these components move as a unit when the knobs are rotated in either of the first and second directions about the axis "Y" (FIG. 20) of rod 556.

Figure 20:
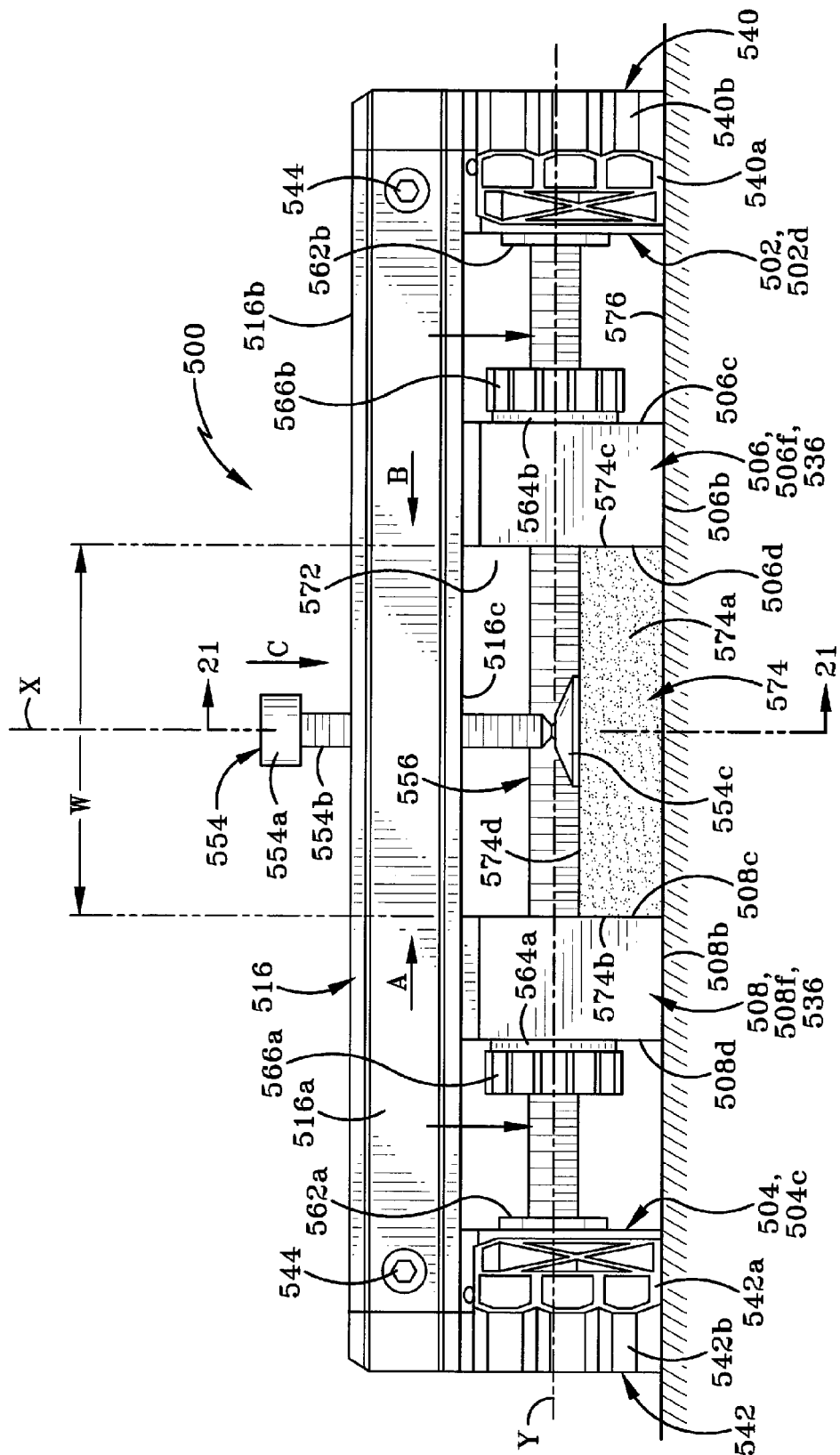
FIG. 20 is a front view of the holding device oriented in a first position and shown retaining a work piece to be routed therein.
Figure 21:
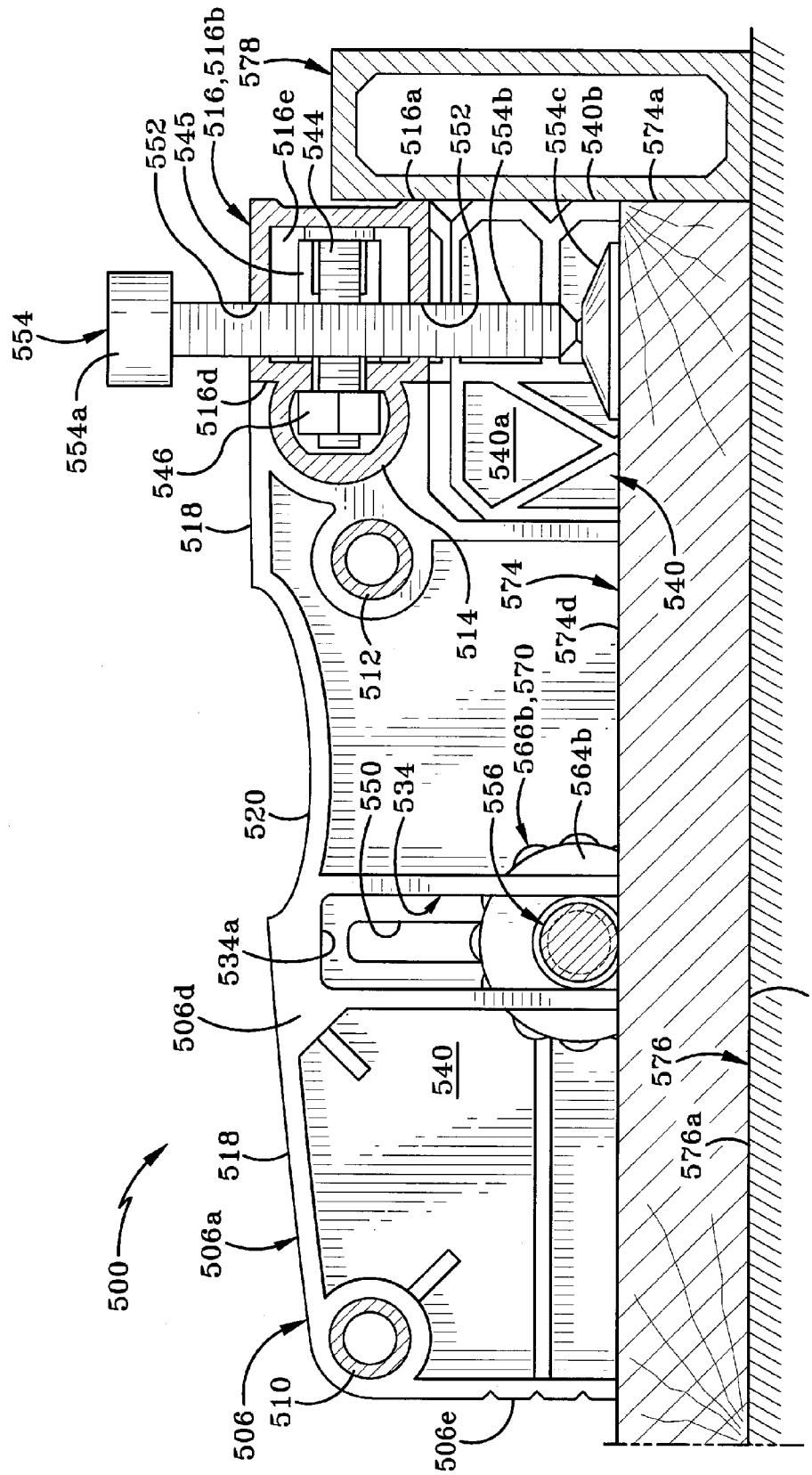
FIG. 21 is cross-sectional left side view of the holding device taken along line 21-21 of FIG. 20.

FIGS. 20-22 illustrate how holding device 500 works. Holding device 500 is able to be oriented in one of two ways. In the first way, shown in FIGS. 20 and 21, holding device 500 is positioned so that a lower face thereof is in abutting contact with upper surface 576a of router table 576. The lower face of holding device 500 is comprised of the second surfaces 502b, 504b, 506b, and 508b of first and second side plates 502, 504, and first and second clamping plates 506, 508. Holding device 500 is moved across upper surface 576a of table 576 until the edge of holding device 500 is in abutting contact with router fence 578. Router fence 578 is disposed perpendicular to upper surface 576a of router table 576. Additionally, the edge of holding device 500 is disposed substantially perpendicular to the lower face thereof. The edge of holding device 500 is comprised of the first end surface 516a, of rail 516, and first ends 540b, 542b of first and second side caps 540, 542.

Alternatively, as shown in FIG. 22, the edge of holding device 500 is positioned in abutting contact with upper surface 576a of router table 576, and the lower face of holding device 500 is positioned in abutting contact with router fence 578.

Referring to FIGS. 20 & 21, a work piece 574 to be routed is slid into a gap 572 (FIG. 20) created between first side surface 508c of second clamping plate 508 and second side surface 506d of first clamping plate 506. Work piece 574 has a first end 574a, a first side 574b, a second side 574c, a first surface 574d and a second surface 574e. First and second knobs 566b, 566a may need to be rotated in the appropriate directions to increase the size of gap 572 to receive work piece 574 therein. Work piece 574 is positioned so that second surface 574e thereof is disposed in abutting contact with first surface 576a of router table 576. When second surface 574e is in the position, it is substantially aligned with the lower face of holding device 500. The lower face of holding device 500 has been defined previously herein. Work piece 574 is moved along first surface 576a of router table 576 until first end 574a of work piece 574 is substantially aligned with the edge of holding device 500. The edge of holding device 500 has been previously defined herein. First and second knobs 566b, 566a are then each rotated in the appropriate one of the first and second directions to reduce the width of the gap 572. The rotation of knobs 566b, 566a is around the longitudinal axis "Y" which extends through threaded rod 566. The activation of first knob 566b causes the first clamping plate 506 to move laterally toward second clamping plate 508. The activation of second knob 566a causes second clamping plate 508 to move laterally toward first clamping plate 506. It will be noted that while both first and second clamping plates 506, 508 are configured to move laterally relative to rail 516, it may only be necessary to move one or the other, or both of first and second clamping plates 506, 508 relative to rail 516 in order to engage work piece 574. The lateral movement of second and first clamping plates 508, 506 is indicated by arrows "A" and "B" in FIG. 20. Engagement of the activation assembly ultimately causes first and second clamping plates 506, 508 to engage the elongated first and second sides 574b, 574c of work piece 574 and to clamp work piece 574 between them. Rail 516, first and second clamping plates 506, 508 and rod 556 form a substantially rectangular box in which work piece 574 is securely retained for routing.

Clamping element 554 is then rotated in an appropriate direction around axis "X" (FIG. 20) which extends through shaft 554b, in order to move protective cap 554c downwardly in the direction of arrow "C" and into abutting contact with first surface 574d of work piece 574. If cap 554c is omitted, the free end (not shown) of shaft 554b will contact first surface 574d. Clamping element 554 provides gentle downward pressure on work piece 574 and prevents it from riding upwardly when one or the other of end 574a or second surface 574e of work piece 574 is routed by a router bit as will be described hereafter. In holding device 500, the clamping force applied by clamping element 554 preferably is applied as close as possible to the center of work piece 574. There is therefore minimal or little to no play or distortion in the holding device 500 during operation thereof.

Threaded rod 556 may be moved downwardly in the direction of arrow "C" to a position where it is disposed a very short distance away from surface 574b to prevent work piece 574 from moving upwardly in the opposite direction to "C". Although not illustrated herein, it will be understood that a protective member may be introduced between the exterior surface of rod 556 and first surface 574d of work piece 574 to prevent damage to work piece 574. Rod 556 is moved upwardly or downwardly within slots 534 by applying pressure to it in the desired direction. Rod 556 may be moved downwardly in the direction of arrow "C" from first end 534a of shaft 534 toward the second end 534b thereof in order to accommodate thinner height work pieces 574. Additionally, rod 556 may be moved upwardly in the opposite direction of arrow "D" to accommodate thicker work pieces 574.

The router assembly used to route work piece 574 is not reproduced in FIGS. 20-22 as such assemblies are well known in the art and are essentially identical to the router assembly shown in FIGS. 1a and 1b. As illustrated in these figures, the type of router assembly contemplated to be used with the present invention includes a router table 5, a router fence 6 and a router bit 7 that extends upwardly through the upper surface of router table 5. The router bit 7 is activated to rotate about an axis disposed at right angles to the upper surface of table 5. FIGS. 1a and 1b show the router bit 7 located in a gap defined in router fence 6. Although not specifically illustrated herein, it is also known to position the fence 6 a spaced distance away from router bit 7 so that a channel is defined between the fence 6 and the router bit 7.

In the present instance, router table 576 is the equivalent of router table 5 and router fence 578 is the equivalent of router fence 6. The router bit is not shown in FIGS. 20-22 but may be as illustrated in FIGS. 1a and 1b or may be spaced a distance away from fence 578 so that it is separated from fence 578 by a channel.

In accordance with a specific feature of the present invention, the router bit is able to be introduced into the cavity 548 (FIG. 1) between first and second side plates 502, 504, if end 574a of work piece 574 is to be routed. The router bit is introduced into cavity 548 prior to activating the same. This prevents first ends 540b, 542b of first and second side caps 540, 542 from being damaged during the routing operation. Holding device 500 is positioned so that the edge thereof is positioned in abutting contact with fence 578 and the lower face thereof is position in abutting contact with table 576. The router bit is then introduced into cavity 548 and the router bit is activated to route end 574a of work piece or second surface 574e of work piece 574, depending on whether the bit is located in a gap in fence 578 or separated from fence 578 by a channel. These types of operation substantially ensure that first ends 506f, 508f of first and second clamping plates 506, 508 are not damaged as they are recessed within cavity 548 and are spaced a distance inwardly away from first ends 516, 540b, 542b.

When work piece 574 is clamped in place by first and second clamping plates 506, 508 and clamping element 554, holding device 500 is moved along fence 578 in a direction parallel to longitudinal axis "Y" for a sufficient distance for the router bit to cut into the desired part of the end 574a or second surface 574e of work piece 574, and most specifically those regions would lay between regions 540a, 542a.

Once work piece 574 has been appropriately routed, holding device 500 is moved away from fence 578 and clamping element 554 is rotated in the opposite direction around axis "X" to disengage cap 554c from first surface 574d of work piece 574. Additionally, first and second knobs 566b, 566a are rotated in the appropriate direction to cause first and second clamping plates 506, 508 to disengage from sides 574b, 574c of work piece 574. Work piece 574 may then be removed from gap 572.

As indicated previously, work piece 574 may also be routed by turning holding device 500 through ninety degrees to bring edge, i.e. first ends 516a, 540b, 542b into contact with first surface 576a of table 576, and to bring lower face, i.e., second surface 574e of work piece 574, into contact with fence 578. Again, holding device 500 when oriented in this manner is slid along router fence 578 in a direction parallel to longitudinal axis "Y" so that the router bit can engage end 574a of work piece 574 and cut into the same.

Thus, holding device 500 may be used in the following ways: Firstly, holding device 500 may be used by positioning the edge 516a, 540b, 542b of holding device 500 in contact with router fence 578; and routing end face 574a of work piece 574 by engaging a router bit (such as bit 7 shown in FIGS. 1a and 1b) which extends upwardly through a gap in fence 578.

Secondly, holding device 500 may be used by positioning edge 516a, 540b, 542b of holding device 500 in contact with router fence 578; and routing the lower face 574e of work piece 574 by engaging a router bit extending upwardly through a gap in router table 576, where the router bit is spaced a distance from router fence 578.

Thirdly, holding device 500 may be used by positioning edge 516a, 540b, 542b of holding device 500 in contact with router table 576; lower face thereof in contact with fence 578, and then routing end face 574a of work piece 574 by engaging a router bit extending upwardly through a gap in router table 576, where the router bit is spaced a distance from router fence 578.

Fourthly, holding device 500 may be used by positioning edge 516a, 540b, 542b of holding device 500 in contact with router table 576; and lower face in contact with fence 578 and then routing lower face 574e of work piece 574 by engaging a bit, such as router bit 7 (FIGS. 1a, 1b) extending upwardly through a gap in fence 578.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A device for holding a work piece to be routed by a router bit extending from a router table; wherein the holding device comprises:
   a first side plate and a second side plate;
   a first clamping plate and a second clamping plate disposed between the first and second side plates;
   a connector member connecting all of the first and second side plates and first and second clamping plates together; and
   an activator assembly engaged with the first and second clamping plates to move them towards and away from each other; and wherein the activator assembly comprises:
      a rod extending between the first and second side plates; and
      a first knob concentrically engaged with the rod, said first knob being positioned between the first side plate and the first clamping plate;
   said first knob being rotatable in a first direction to move the first clamping plate away from the first side plate, and in a second direction to move the first clamping plate toward the first side plate.

2. The holding device as defined in claim 1, wherein the activator assembly has a longitudinal axis that is substantially parallel to a longitudinal axis of the connector member, and wherein the first and second clamping plates are disposed at right angles to the longitudinal axis.

3. The holding device as defined in claim 2, wherein the activator assembly moves the first and second clamping plates laterally toward and away from each other.

4. The holding device as defined in claim 1, wherein the first clamping plate further includes:
   a first side surface and a second side surface that are disposed at right angles to the rod;
   a first aperture defined in the first clamping plate; said first aperture extending between the first and second side surfaces of the first clamping plate; and wherein the rod passes through the first aperture; and
   a first spacer is engaged around the rod and is receivable through the first aperture.

5. The holding device as defined in claim 4, wherein the first spacer includes:
   a first region having a width substantially equal to a width of the first aperture; and
   a second region having a diameter larger than the width of the first aperture; and wherein the larger diameter second region is positioned adjacent one of the first and second side surfaces of the first clamping plate.

6. The holding device as defined in claim 5, wherein the second region is positioned adjacent one of the first and second side surfaces that is adjacent the first side plate and remote from the second clamping plate.

7. The holding device as defined in claim 4, wherein the first aperture comprises an elongate slot which extends for a distance between a first surface and a second surface of the first clamping plate; and wherein the position of the rod within the slot and relative to the first surface of the first clamping plate is adjustable.

8. The holding device as defined in claim 1, further comprising:
a second knob concentrically engaged with the rod; said second knob being positioned between the second side plate and the second clamping plate; said second knob being rotatable in a first direction to move the second clamping plate away from the second side plate, and rotated in a second direction to move the second clamping plate toward the second side plate.

9. The holding device as defined in claim 8, wherein the second clamping plate further includes:
a first side surface and a second side surface that are disposed at right angles to the rod;
a second aperture defined in the second clamping plate; said second aperture extending between the first and second side surfaces of the second clamping plate; wherein the second aperture is aligned with the first aperture in the first clamping plate; and the rod passes through both of the first and second apertures; and
a second spacer is engaged around the rod and is receivable through the second aperture.

10. The holding device as defined in claim 9, wherein the second spacer includes:
a first region having a width substantially equal to a width of the second aperture; and
a second region having a diameter larger than the width of the second aperture; and wherein the larger diameter second region of the second spacer is positioned adjacent the one of the first and second side surfaces of the second clamping plate that is disposed adjacent the second side plate and remote from the first clamping plate.

11. The holding device as defined in claim 1, wherein the connector member includes a rail that is secured to a first end of each of the first and second side plates and first and second clamping plates; and wherein the first end of each of the first and second side plates is fixedly secured to the rail, and the first end of each of the first and second clamping plates is movably engaged with the rail.

12. A device for holding a work piece to be routed by a router bit extending from a router table;
wherein the holding device comprises:
a first side plate and a second side plate;
a first clamping plate and a second clamping plate disposed between the first and second side plates;
a connector member connecting all of the first and second side plates and first and second clamping plates together; wherein the connector member includes a rail that is secured to a first end of each of the first and second side plates and first and second clamping plates; and wherein the first end of each of the first and second side plates is fixedly secured to the rail, and the first end of each of the first and second clamping plates is movably engaged with the rail;
an activator assembly engaged with the first and second clamping plates to move them towards and away from each other; and
a clamping element engaged with the rail at a location intermediate the first and second clamping plates; and
wherein the clamping element is adapted to engage a first surface of the work piece when the work piece is clampingly engaged between the first and second clamping plates.

13. The holding device as defined in claim 12, wherein the rail further comprises an aperture defined therein and extending between a first surface and a second surface thereof; and wherein the clamping element includes:
a shaft configured to extend through the aperture in the rail;
a head provided at a first end of the shaft; and wherein the clamping element is rotatable about an axis, where the axis extends along the shaft from the first end of the shaft to a second end of the shaft; and
when the head is rotated in a first direction the second end of the shaft moves downwardly away from the second surface of the rail; and when the head is rotated in a second direction, the second end of the shaft moves upwardly towards the second surface of the rail.

14. A method of routing a work piece using a router device having a router table and a router fence that are positioned perpendicular to each other; said method including the steps of:
engaging the work piece in a holding device such that an end of the work piece is substantially aligned with an edge of the holding device;
positioning the edge of the holding device in abutting contact with one of the router table and router fence;
positioning a face of the holding device that is disposed at right angles to the edge of the holding device in abutting contact with the other of the router table and the router fence;
activating the router device;
moving the holding device across the router table in a direction substantially parallel to the router fence while maintaining the one of the edge and the face of the holding device in abutting contact with the router fence; and
routing the end of the work piece with a router bit that extends upwardly from an upper surface of the router table; and wherein the step of engaging the work piece in the holding device comprises the steps of:
positioning the work piece in a gap defined between a first clamping plate and a second clamping plate and so that the end of the work piece is substantially aligned with the edge of the holding device;
engaging an activation assembly to move the first and second clamping plates laterally towards each other and thereby towards the work piece;
clamping the work piece between the first and second clamping plates in such a way that the first clamping plate is in abutting contact with a first elongate side of the work piece and the second clamping plate is in abutting contact with a second elongate side of the work piece.

15. The method as defined in claim 14, wherein the step of engaging an activation assembly further includes the steps of:
rotating a first knob around a threaded rod that extends between the first and second clamping plates in one of a first direction and a second direction;
pushing the first clamping plate laterally towards the second clamping plate;
rotating a second knob around the threaded rod in one of the first direction and the second direction; and
pushing the second clamping plate laterally towards the first clamping plate.

16. The method as defined in claim 14, further comprising the steps of:
- rotating a clamping element disposed in an aperture in a rail that is located between the first and second clamping plates in one of a first direction and a second direction;
- moving a free end of the clamping element downwardly towards a first surface of the work piece; and
- positioning the free end of the clamping element adjacent the first surface of the work piece.

17. The method as defined in claim 14, wherein the step of positioning the holding device on the router table includes the steps of:
- positioning the edge of the holding device in contact with the router fence; and
- routing the end face of the work piece by engaging a router bit extending upwardly through a gap in the fence.

18. The method as defined in claim 14, wherein the step of positioning the holding device on the router table includes the steps of:
- positioning the edge of the holding device in contact with the router fence; and
- routing the lower face of the work piece by engaging a router bit extending upwardly through a gap in the table, where the router bit is spaced a distance from the router fence.

19. The method as defined in claim 14, wherein the step of positioning the holding device on the router table includes the steps of:
- positioning the edge of the holding device in contact with the router table; and
- routing the end face of the work piece by engaging a router bit extending upwardly through a gap in the table, where the router bit is spaced a distance from the router fence.

20. The method as defined in claim 14, wherein the step of positioning the holding device on the router table includes the steps of:
- positioning the edge of the holding device in contact with the router table; and
- routing the lower face of the work piece by engaging a bit extending upwardly through a gap in the fence.

21. The holding device as defined in claim 11, further comprising:
- a clamping element engaged with the rail at a location intermediate the first and second clamping plates; and
- wherein the clamping element is adapted to engage a first surface of the work piece when the work piece is clampingly engaged between the first and second clamping plates.

22. The holding device as defined in claim 21, wherein the rail further comprises an aperture defined therein and extending between a first surface and a second surface thereof; and wherein the clamping element includes:
- a shaft configured to extend through the aperture in the rail;
- a head provided at a first end of the shaft; and wherein the clamping element is rotatable about an axis, where the axis extends along the shaft from the first end of the shaft to a second end of the shaft; and when the head is rotated in a first direction the second end of the shaft moves downwardly away from the second surface of the rail; and when the head is rotated in a second direction, the second end of the shaft moves upwardly towards the second surface of the rail.

* * * * *